United States Patent
Sato et al.

(10) Patent No.: US 6,336,754 B1
(45) Date of Patent: Jan. 8, 2002

(54) SETTING COMMUNICATION SYSTEM IN ACCORDANCE WITH TYPE OF LENS ATTACHED TO BODY

(75) Inventors: Osamu Sato; Satoru Horita, both of Saitama; Hisashi Tatamiya, Tokyo; Tomoaki Kobayashi, Saitama; Takahiro Kobayashi, Tokyo., all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/205,685

(22) Filed: Dec. 4, 1998

(30) Foreign Application Priority Data

Dec. 5, 1997 (JP) .............................. 9-336029

(51) Int. Cl.[7] .............................. G03B 17/00
(52) U.S. Cl. ...................................... 396/529
(58) Field of Search ................. 396/529, 530, 396/531, 532

(56) References Cited

U.S. PATENT DOCUMENTS

| | | | |
|---|---|---|---|
| 4,357,089 A | 11/1982 | Okura et al. ................. 354/286 |
| 4,417,798 A | 11/1983 | Ohkura et al. ............... 354/271 |
| 4,420,239 A | 12/1983 | Yasuyuki et al. ........... 354/286 |
| 4,841,322 A | 6/1989 | Kawasaki et al. .......... 354/400 |
| 4,862,208 A | 8/1989 | Yamada et al. ............. 354/485 |
| 4,945,376 A | 7/1990 | Kawasaki et al. .......... 354/400 |
| 5,182,591 A | 1/1993 | Kawasaki et al. ....... 354/195.1 |
| 5,214,464 A | 5/1993 | Karasaki et al. ............. 354/286 |
| 5,505,535 A | 4/1996 | Kawasaki et al. .......... 354/400 |
| 5,781,818 A | 7/1998 | Kobayashi et al. ......... 396/529 |

Primary Examiner—Christopher E. Mahoney
(74) Attorney, Agent, or Firm—Greenblum & Bernstein, P.L.C.

(57) ABSTRACT

A camera body in which, when a photographic lens is attached to the camera body, data exchange is carried out by communicating with the photographic lens via a plurality of contact pins electrically connected to each other. The camera body includes: a reset pin as one of the contact pins which outputs a reset signal and a reset release signal; an identifying pin as another of the contact pins for identifying an attached photographic lens; and an identifying device which identifies an attached photographic lens according to the change of electric potential of the identifying pin upon the output of the reset release signal to the reset pin.

7 Claims, 28 Drawing Sheets

SETTING COMMUNICATION SYSTEM IN ACCORDANCE WITH TYPE OF LENS ATTACHED TO BODY

BACKGROUND OF THE INVENTION

1. Field of the Invention

The present invention relates to a single-lens reflex camera having data-transmission pins (contact members) at positions other than on the lens mount surface thereof; and in particular, to a photographic lens, a camera body and a camera system of a medium-format single-lens reflex camera.

2. Description of the Related Art

In single-lens reflex cameras of the prior art, a contact pin group (a lens pin group) at a position other than the lens mount surface of the photographic lens thereof has been provided (for example at an inside part of the lens mount surface) having a plurality of contact pins in order to identify open aperture data and minimum aperture data. A corresponding contact pin group (body pin group) having a plurality of contact pins which make contact with the lens pin group is provided in the vicinity of a lens mount surface of the camera body. The electric potential (level) at these contact pin groups are checked; subsequently, the open aperture data and the minimum aperture data are input in the camera body.

Recently, there has been requirements for functions that are not provided in photographic lenses or camera bodies of the prior art. However, when a photographic lens or a camera body is to be equipped with additional new functions, there arises a problem of compatibility between pre-existing and new photographic lenses or camera bodies; in particular, the compatibility of the contact members and the communication system which carries out data transmission between the photographic lens and the camera body.

FIGS. 4 and 5 are examples of lens mounts of a photographic lens and a camera body of the prior art. The aperture data setting pin group (a contact pin group) includes a series of lens pins 75a, 75b, 75c, 75d, 75j, 75k and 75l. The lens pins 75a through 75d and 75j through 75l are aligned in a circle, the center of which lies on the optical axis of photographic lens 71 closer to the optical axis than mount ring 72 and bayonet plate 73 (i.e., inside the concentric circles of the mount ring 72 and the bayonet plate 73) of the photographic lens 71. The aperture data is transmitted from the lens pins 75a, 75b, 75c, 75d, 75j, 75k and 75l to corresponding body pins 55a, 55b, 55c, 55d, 55j,55k and 55l, which serve as data-transmission pins, in order to be read by a camera body 51. The body pins 55a through 55d and 55j through 55lare also aligned in a circle, the center of which lies on the optical axis of the camera body 51, closer to the optical axis than mount ring 52 or bayonet plate 53 (i.e., inside the concentric circles of the mount ring 52 and the bayonet plate 53) of the camera body 51. Each of the lens pins 75a through 75d and 75j through 75lis fixed on a protection ring 74 made of an insulating material, each protruding from each hole therefor formed in the protection ring 74. Each of the body pins 55a through 55d and 55j through 55lis also fixed on a pin supporting plate 56 made of an insulating material, each protruding from each hole therefor formed in the pin protection plate 56. A spring force is applied to each of the body pins 55a through 55d and 55j through 55lby a spring (not shown), whereby the body pins 55a through 55d and 55j through 55lcan protrude from the pin supporting plate 56 or sink therein. Furthermore, the mount ring 52 and the bayonet plate 53 of the camera body 51 and the mount ring 72 and bayonet plate 73 of the photographic lens 71 are all formed from metal. Consequently, when the photographic lens 71 is attached to the camera body 51, each mount ring (72 and 52 respectively) and each bayonet plate (73 and 53 respectively) make contact with each other, wherein the electric potential level thereof becomes the same as ground.

However, when the above-mentioned photographic lens is equipped with new functions such as ROM, an AF motor and a controller therefor, or a lens shutter and a controller therefor; sufficient data or command communication relating to such new functions cannot be carried out using pre-existing, former lens pins 75a through 75d and 75j through 75land body pins 55a through 55d and 55j through 55l. Furthermore, though a new-designed photographic lens having additional lens pins can be matched with a new-designed camera body also having additional body pins, if such a new (designed) photographic lens having additional lens pins is attached to a pre-existing camera body, the additional lens pins cannot make contact with any member of the pre-existing camera body. Therefore it is impossible to carry out data or command communication between the new photographic lens and the pre-existing camera body. In other words, the pre-existing camera body cannot recognize the new commands of the new photographic lens.

Further, if the photographic lens incorporates a control device such as a CPU, or if the photographic lens does not incorporate the control device such as a CPU but incorporates a lens data memory such as a ROM, it is necessary to firstly identify whether the attached photographic lens is a ROM-incorporated lens or a CPU-incorporated lens. However, as compared with the data loading time from the ROM, the CPU requires a longer start-up time before executing the program after the power is turned ON. Thus, a longer time is required to identify the type of photographic lens attached to the camera body.

SUMMARY OF THE INVENTION

It is an object of the present invention to provide a photographic lens, a camera body and a camera system, each of which can immediately identify whether the photographic lens attached to the camera body incorporates a memory or a control device.

To achieve the object mentioned above, according to the present invention, there is provided a camera body in which, when a photographic lens is attached to the camera body, data exchange is carried out by communicating with the photographic lens via a plurality of contact pins electrically connected to each other. The camera body includes: a reset pin as one of the contact pins which outputs a reset signal and a reset release signal; and an identifying pin as another of the contact pins for identifying an attached photographic lens.

Preferably, an identifying device is provided which identifies an attached photographic lens according to the change of electric potential of the identifying pin upon the output of the reset release signal to the reset pin.

Preferably, whether or not the electric potential of the identifying pin changes is detected immediately after the output of the reset release signal to the reset pin; and when a change of electric potential is detected, the identifying device identifies that an attached photographic lens incorporates a memory.

Preferably, the reset signal is firstly output to the reset pin, then whether or not the electric potential of the identifying pin changes is detected by the output of the reset release signal to the reset pin; and when a change of electric potential level is detected, the identifying device identifies that an attached photographic lens incorporates a control device.

According to another aspect of the present invention, there is provided a photographic lens including a plurality of contact pins including a reset pin and an identifying pin; wherein data communication is carried out via contact of the contact pins when the photographic lens is attached to a camera body, the photographic lens includes: a memory not including a control device; and a response device in which, when the reset pin receives a reset release signal from the camera body, the electric potential of the identifying pin changes.

Preferably, when the reset release signal is applied to the reset pin, the response device is synchronized with a clock input from the camera body via a data pin other than the reset pin or the identifying pin, wherein data recorded in the memory is converted to serial data output from the identifying pin.

According to another aspect of the present invention, there is provided a camera system which includes a photographic lens and a camera body respectively having a plurality of contact pins including a reset pin and an identifying pin; wherein data communication is carried out via contact of the contact pins when the photographic lens is attached to the camera body. If the photographic lens incorporating a memory does not include a control device, the photographic lens further includes a response device in which the electric potential level of the identifying pin changes when the reset pin of the photographic lens receives a reset release signal from the camera body; and the camera further including an identifying device which identifies whether or not an attached photographic lens incorporates the memory, by detecting the change of electric potential of the identifying pin through the output of the reset release signal to the reset pin of the camera body.

Preferably, if the photographic lens includes the control device, upon output of the reset release signal from the camera body to the reset pin, the electric potential of one predetermined contact pin of the plurality of contact pins, that is not the reset pin of the photographic lens, falls once and then rises; wherein the camera body identifies that an attached photographic lens includes the control device by detecting the change of electric potential of the one predetermined contact pin.

Preferably, data loading is carried out by serial communication via the identifying pin from the memory when the identifying device identifies that an attached photographic lens includes the memory.

Preferably, the identifying pin of the photographic lens incorporating the memory also serves as a data pin when the reset release signal is input to the reset pin; wherein data read from the memory, according to clock output from the camera body, are output to the camera body.

The present disclosure relates to subject matter contained in Japanese Patent Application No.09-336029 (filed on Dec. 5, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
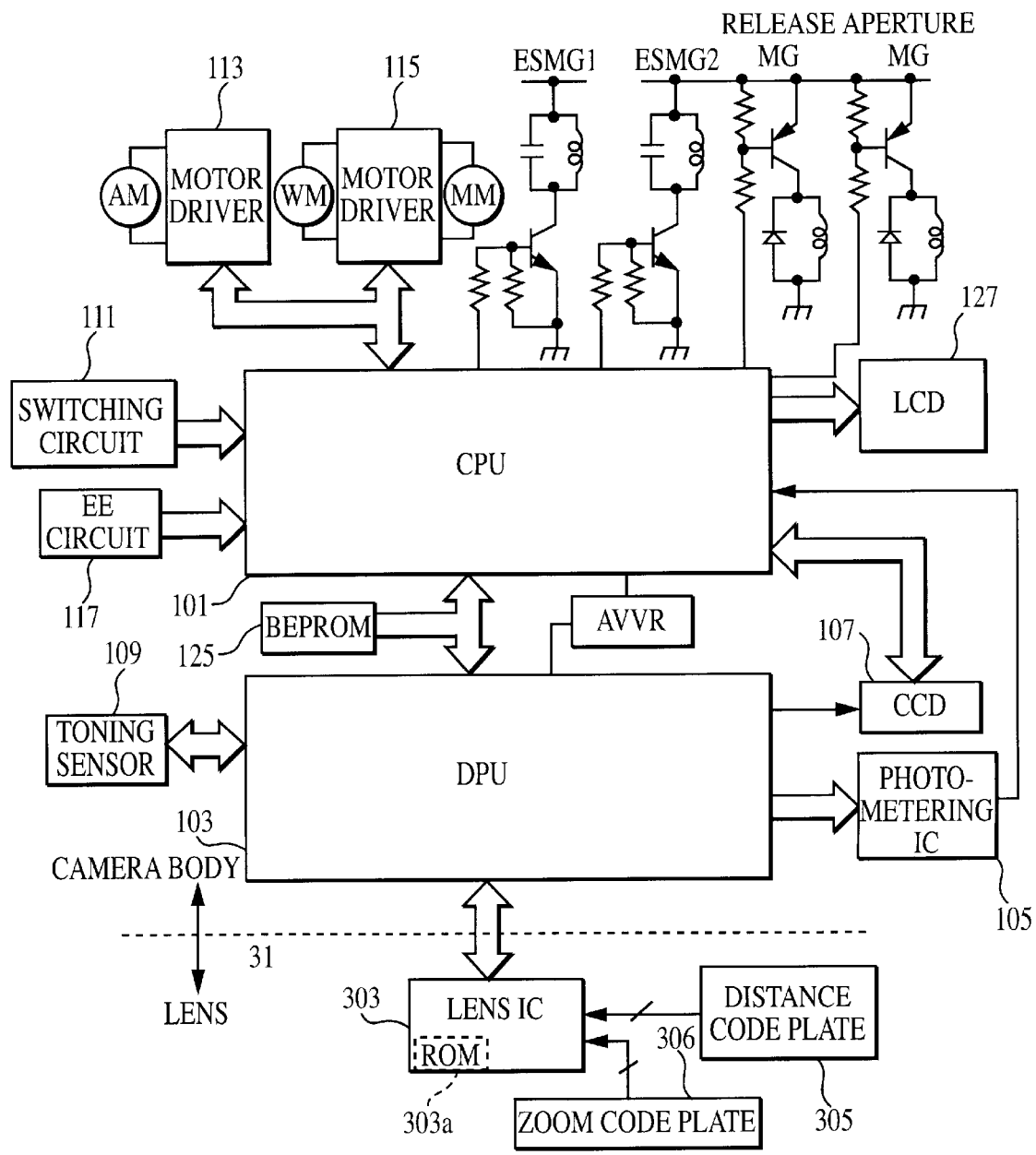
FIG. 1 is a block diagram of the main circuits of a single-lens reflex camera according to an embodiment of the present invention.

The present invention will be described below with reference the drawings. FIG. 1 is a block diagram of main parts of a single-lens reflex camera according to an embodiment of the present invention. The optical and mechanical structures of this single-lens reflex camera are know per se; hence are not illustrated. In addition, a camera body of this single-lens reflex camera is hereinafter referred to as "a new camera body" 11, and a photographic lens thereof is hereinafter referred to as "a new photographic lens" 31. The new camera body 11 is provided with a CPU 101 serving as a controller in order to control all operations of the camera; and with a DPU 103, which serves as a data transmission device between the new camera body 11 and the new photographic lens 31, and which also controls a photometering IC 105 and a toning sensor 109 for measuring the object brightness. The new photographic lens 31 is incorporated with a lens IC 303 provided with a ROM 303a. The DPU 103 executes a predetermined communication (a second communication) between the DPU 103 and the lens IC 303, in order to receive lens data from the lens IC 303. The lens IC 303 also serves as a communication device between the lens IC 303 and the DPU 103.

There is a switching circuit 111 including switches (not shown) actuated by the user, such as a photometering switch SWS and a release switch SWR, and also switches which are turned ON/OFF according to predetermined operations of the camera, such as a rear cover switch inter-connected with the opening and closing of the rear cover. The switching circuit 111 is connected to an input terminal of the CPU 101. There is an EEPROM 125 in which predetermined photographic data such as a preset photographic mode and the number of photographed frames, is written. In addition, an LCD 127 which indicates a photographic mode, the number of photographed frames, and the state of battery. The EEPROM 125 and the LCD 127 are connected to the input terminal of the CPU 101.

When the photometering switch SWS is turned ON, the object brightness signal is input from the photometering IC 105; the aperture value and shutter speed are calculated according to the film speed, the defocus amount is calculated upon driving the CCD 107, and an AF motor AM is driven via a motor driver 113. The rotation of the AF motor AM is transmitted to the new photographic lens 31 via a transmission mechanism (not shown) and also via a focusing lens driving mechanism (also not shown), whereby the focusing lens group can be driven to an in-focus position.

When the release switch SWR is turned ON, the CPU 101 energizes a front curtain magnet ESMg1 and a rear curtain magnet ESMg2 in order to hold a shutter front curtain and a shutter rear curtain (not shown) by electromagnetic force. The CPU 101 further energizes a release magnet RLMg in order to release the mechanical holding of a front curtain charge spring, a rear curtain charge spring and a mirror charge spring (not shown). Thus the restoring force of the mirror charge spring upwardly moves a mirror (not shown), thereby an interlocked diaphragm driving lever (not shown) is moved at the same time. The amount of movement of the diaphragm driving lever is counted and calculated by the pulse number output from an EE circuit 117, whereby an aperture value is obtained. When the obtained aperture value reaches a predetermined aperture value, an aperture magnet EEM is energized in order to stop the closing of the diaphragm. When the upward movement of the mirror is completed, the electric power to the front curtain magnet ESMg1 is cut, thereby the shutter front curtain is actuated in order to start an exposure. After expiration of the pre-calculated shutter speed (exposure time), the electric power to the rear curtain magnet ESMg2 is cut, thereby the shutter rear curtain is actuated in order to finish the exposure.

The new photographic lens 31 is provided with a distance code plate 305. The position of the focusing lens group (not shown) detected by the distance code plate 305 is input in the lens IC 303. In the present embodiment, a 3-bit distance code plate 305 is used for detecting the position of the focusing lens group, in which the photographing distance is divided into eight zones. The positional data of the focusing lens group among the eight zones is sent to the lens IC 303, and this information is further read by the CPU 101 via the DPU 103. In this regard, the ROM 303a of the lens IC 303 has a plurality of page-addresses corresponding to a zoom lens, thus the information (data) of the page-address selected by a zoom code plate 306 is read by the CPU 101 via the DPU 103.

The structure of pins serving as contact members of the photographic lens and the camera body according to the embodiment of the present invention will now be described.

The present invention relates to a photographic lens and a camera body which can communicate with each other by reading data via contact members thereon, respectively; i.e., a lens pin group and a body pin group, provided on a position inside the lens mount or inside the lens mount surface in order to maintain compatibility with a pre-existing photographic lens or a pre-existing camera body. There is provided a new lens pin group and a new body pin group as first contact members and second contact members, respectively, in addition to a pre-existing lens pin group and a pre-existing body pin group; whereby new functions can be added to the photographic lens and to the camera body. A lens pin of the new lens pin group (the first contact member) is movable and electrically connected to another lens pin of the new lens pin group (the second contact member). When the movable lens pin is in a protrusive state, the movable lens pin is also electrically connected to a lens-side lens mount serving as a grounding member. When the movable lens pin is pressed and sunk inward, the movable lens pin is insulated from the lens-side lens mount.

Further, when the new photographic lens is attached to the new camera body as above discussed, the movable lens pin is pressed by a corresponding new body pin of the new camera body, thereby the movable lens pin is insulated from the lens-side lens mount. Conversely, when the new photographic lens is attached to a pre-existing camera body, the new lens pin group of the new photographic lens is not in contact with a body pin group of the pre-existing camera body, thereby both the movable lens pin and the other lens pins are grounded to the lens-side lens mount.

Figure 2:
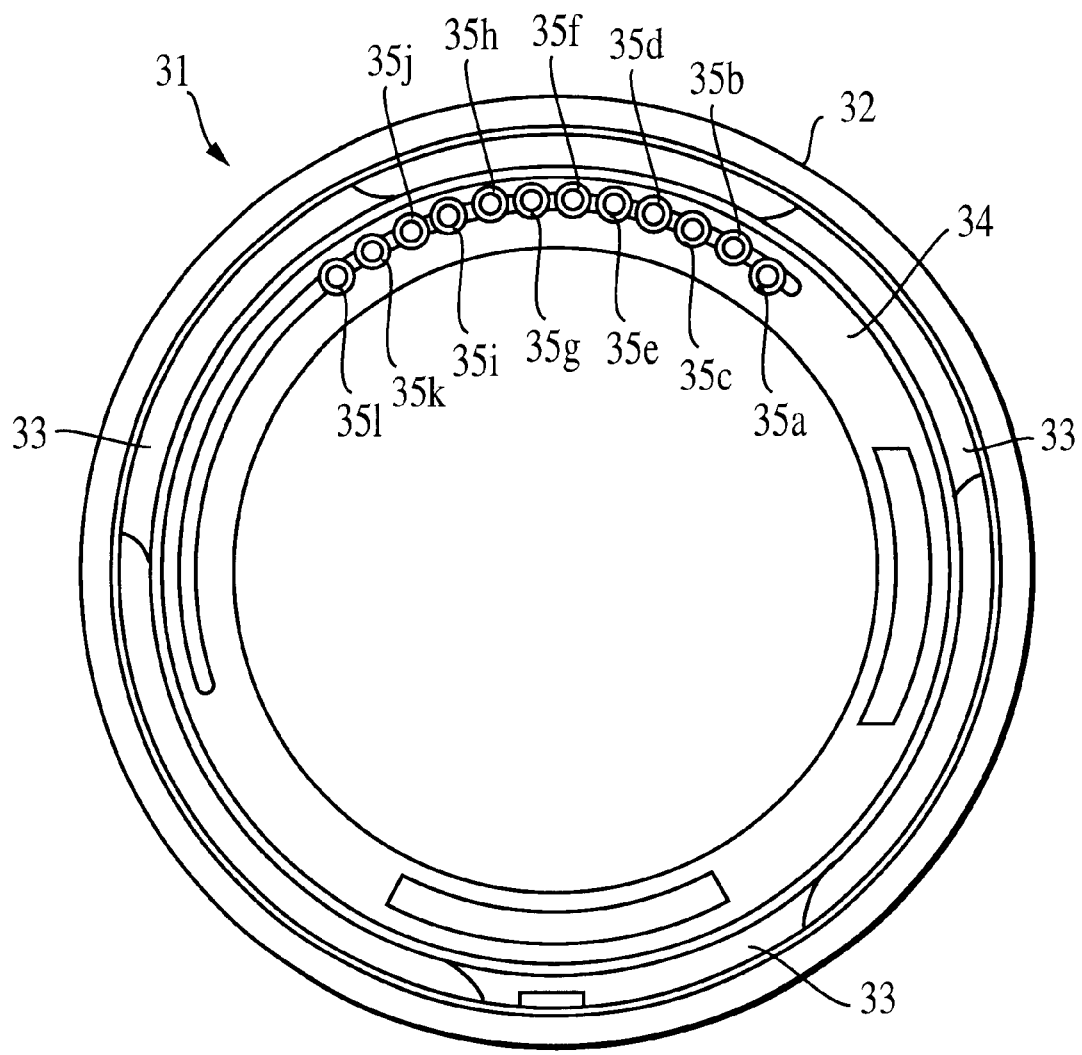
FIG. 2 is an elevational view of a lens mount of a new photographic lens of the single-lens reflex camera of FIG. 1.
Figure 3:
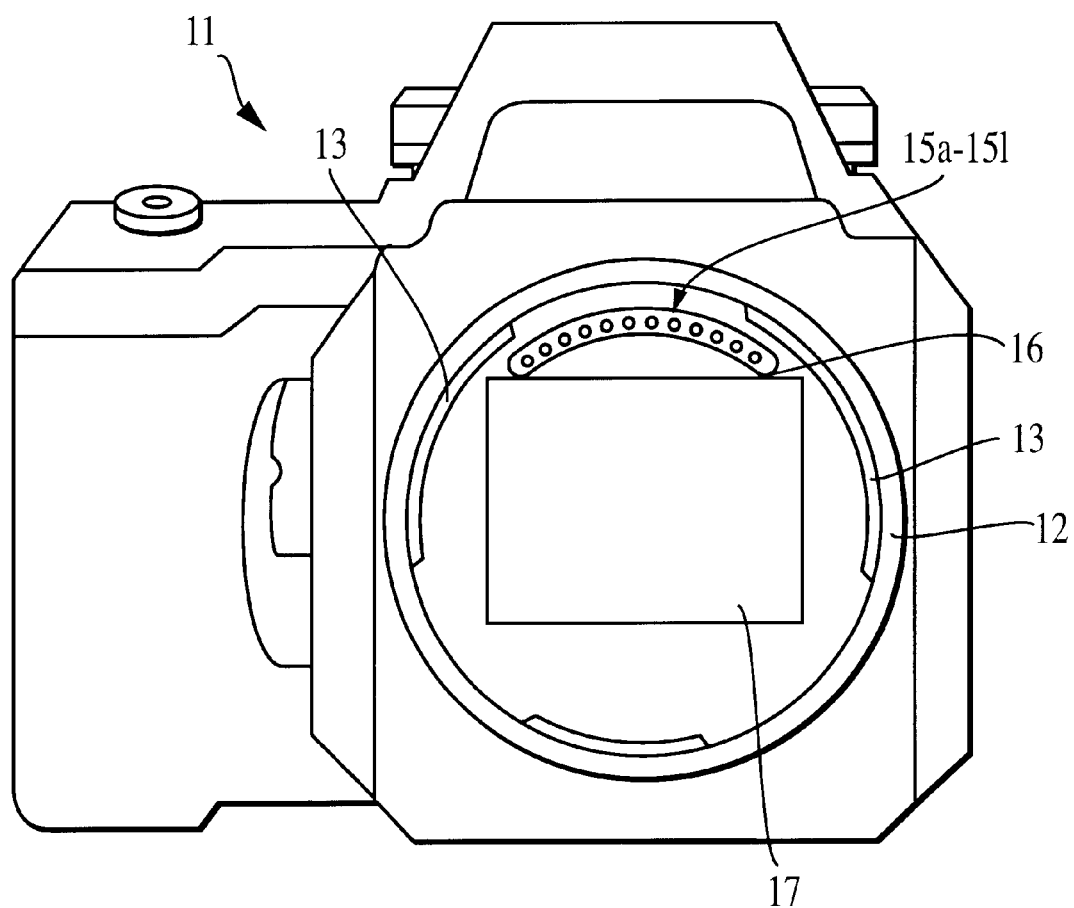
FIG. 3 is an elevational view of a lens mount of a new camera body of the single-lens reflex camera of FIG. 1.

FIGS. 2 and 3 illustrate respective lens mounts of the new photographic lens 31 and the new camera body 11 incorporating a circuit as shown in FIG. 1. The new photographic lens 31 has twelve lens pins 35a, 35b, 35c, 35d, 35e, 35f, 35g, 35h, 35i, 35j, 35k and 35l, arranged in a circle. The center of the circle of the lens pins 35a through 35l is along the optical axis and is coaxial with a lens-side mount ring 32 and a lens-side bayonet plate 33, but is positioned closer to the optical axis (i.e., inside the circles of the lens-side mount ring 32 and the bayonet plate 33). Similarly, the new camera body 11 has twelve body pins 15a, 15b, 15c, 15d, 15e, 15f, 15g, 15h, 15i, 15j, 15k and 15l, arranged in a circle. The circle of the body pins 15a through 15l is also coaxial with a body-side mount ring 12 and a body-side bayonet plate 13, but is positioned closer to the optical axis (i.e., inside the circles of the body-side mount ring 12 and the bayonet plate 13). The positions of the lens pins 35a through 35d and 35j through 35l are identical to lens pins 75a through 75d and 75j through 75l of a pre-existing photographic lens 71, and the positions of the body pins 15a through 15d and 15j through 15l are also identical to body pins 55a through 55d and 55j through 55l of a pre-existing camera body 51. Namely, the five body pins 15e, 15f, 15g, 15h and 15i, and the five lens pins 35e, 35f, 35g, 35h and 35i, are newly provided pins. Furthermore, as with a pre-existing photographic lens being attached to a pre-existing camera body; likewise, the mount ring 12 and the bayonet plate 13 of the new camera body 11, and the mount ring 32 and bayonet plate 33 of the photographic lens 31 are all formed from metal. Consequently, when the photographic lens 31 is attached to the camera body 11, each mount ring (32 and 12 respectively) and each bayonet plate (33 and 13 respectively) make contact with each other, wherein the electric potential level thereof becomes the same as ground. In other words, in any of the possible configurations of a new or pre-existing photographic lens and a new or pre-existing camera body, of which there are four possible attachment variations; the mount ring and bayonet plate of the camera body, and the mount ring and bayonet plate of the photographic lens all have the same electric potential level; namely, ground.

Figure 6:
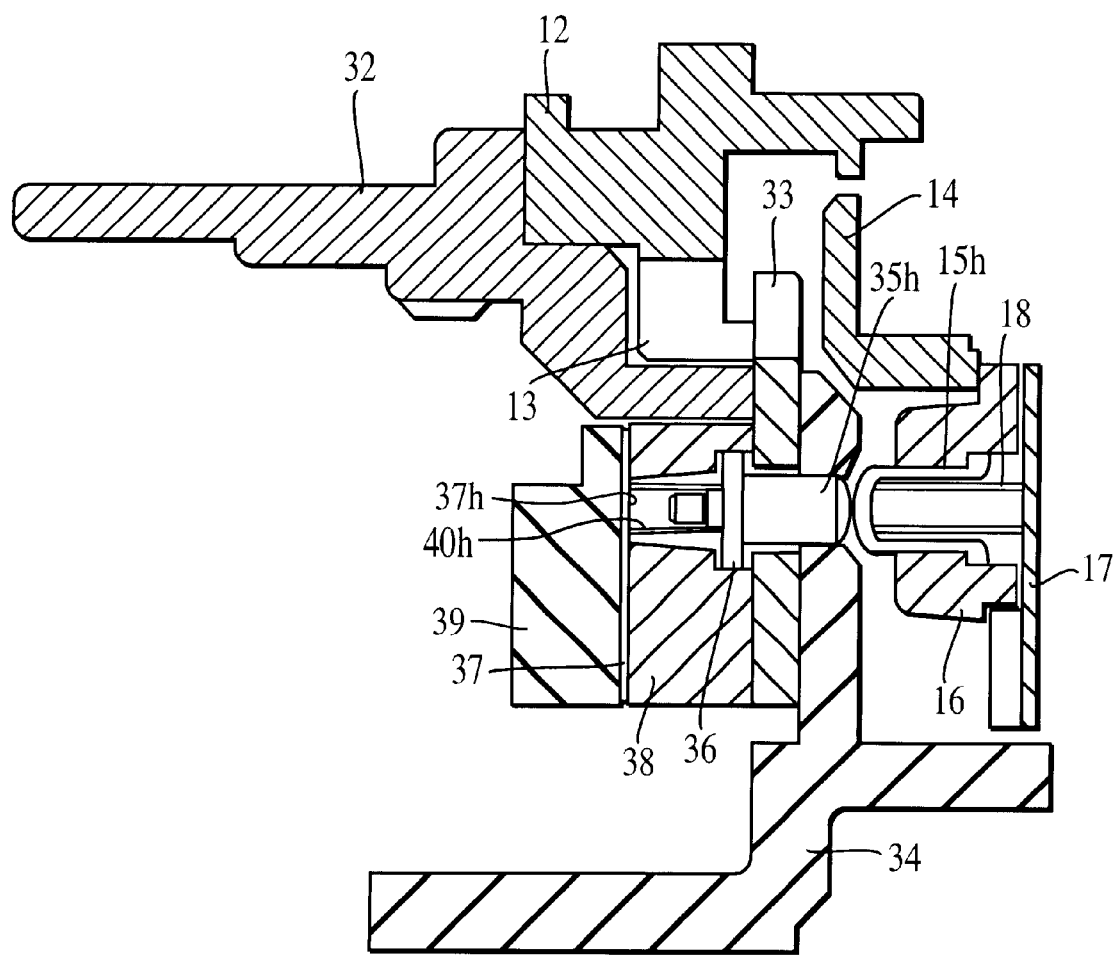
FIG. 6 is an expanded sectional view showing a structure of movable lens pins when the new photographic lens is attached to the new camera body.

Although the body pins 15a through 15l of the new camera body 11 are all movable pins, the lens pins 35a through 35l of the new photographic lens 31 are fixed (immovable) pins, except for the movable lens pin 35h. The structure of the movable lens pin 35h and the corresponding body pin 15h will be described with reference to FIG. 6. The lens pins 35a through 35i are supported by a lens pin supporting plate 38 made of an insulating material. The lens pin supporting plate 38 is secured to the bayonet plate 33 made of a conductive material. The movable lens pin 35h is inserted in a pin hole formed in the lens pin supporting plate 38, movable in both protrusive and retracting directions, and the top of the lens pin 35h protrudes from a pin hole penetrating through the bayonet plate 33 and a protection ring 34. The outer surface (the side facing the camera body) of the bayonet plate 33 is covered by a flange of the protection ring 34 made of an insulating material.

Figure 10:
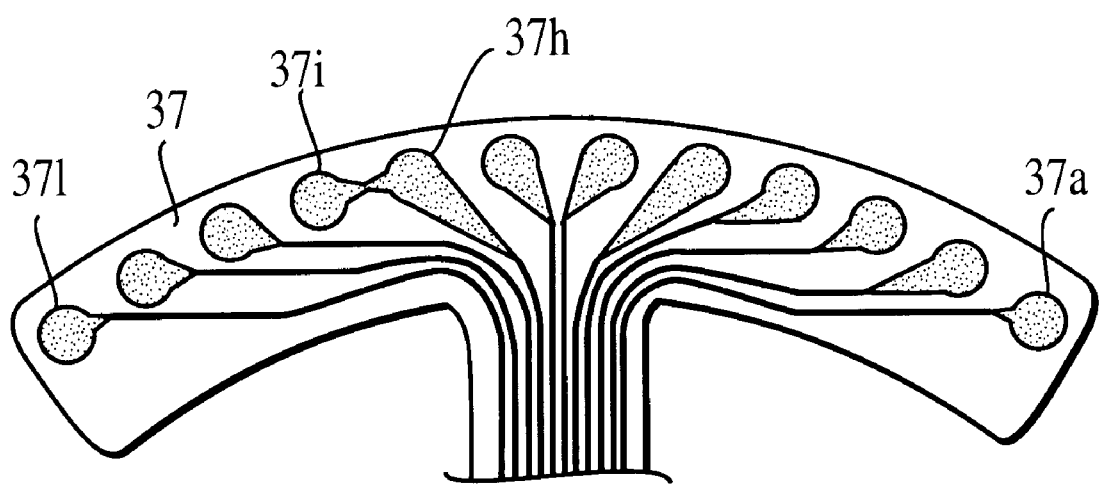
FIG. 10 is a plan view of a printed circuit board to be in contact with lens pins of the new photographic lens.

A flexible printed circuit board 37 is pressed against the rear surface of the lens pin supporting plate 38 by printed circuit board presser plate 39; accordingly, the pin hole of the lens pin supporting plate 38 is closed. The shape of the flexible printed circuit board 37 is illustrated in FIG. 10. Contacts 37a through 37l on the flexible printed circuit board 37 are formed so as to be in contact with the lens pins 35a through 35l. Thus, each of the lens pins 35a through 35l is electrically connected to each of the corresponding contacts 37a through 37l. The contacts 37a through 37l are also connected to in/out terminals of the lens IC 303.

It should be noted that the contact 37h and the contact 37i are electrically connected to each other. Namely, the movable lens pin 35h and the lens pin 35i are electrically connected to each other.

Referring back to FIG. 6, a compression spring 40h made of conductive material is included in a space between the movable lens pin 35h and the flexible printed circuit board 37. The compression spring 40h is in contact with the contact 37h of the flexible printed circuit board 37, and also with a brim-shape flange 36 provided on the surface of the movable lens pin 35h; wherein a spring force in the protrusive direction is applied to the movable lens pin 35h, and thereby the movable lens pin 35h and the contact 37h are electrically connected to each other.

Figure 7:
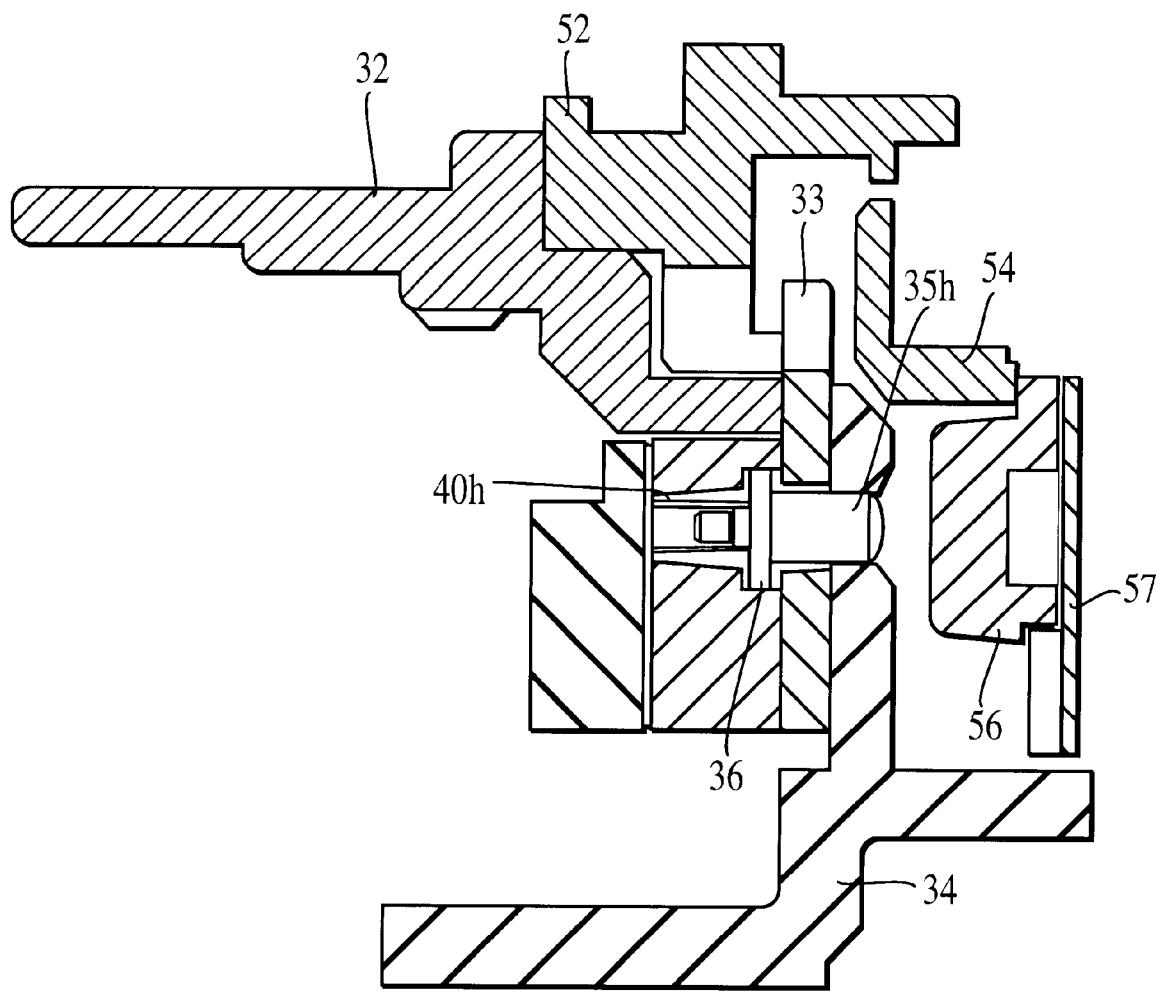
FIG. 7 is an expanded sectional view showing a structure of the movable lens pins when the new photographic lens is attached to a pre-existing camera body.

When the movable lens pin 35h is not pressed or retracted, for example when the new photographic lens 31 is not attached to the new camera body 11, the movable lens pin 35h protrudes due to elastic force of the compression spring 40h, thereby the flange 36 is in contact with the bayonet plate 33 (see FIG. 7). In such a state, since the bayonet plate 33 is grounded, the movable lens pin 35h is also grounded. Further, since the movable lens pin 35h is electrically connected to the contact 37h via the compression spring 40h, the electrically connected contact 37i, and the lens pin 35i, are also grounded.

Figure 9:
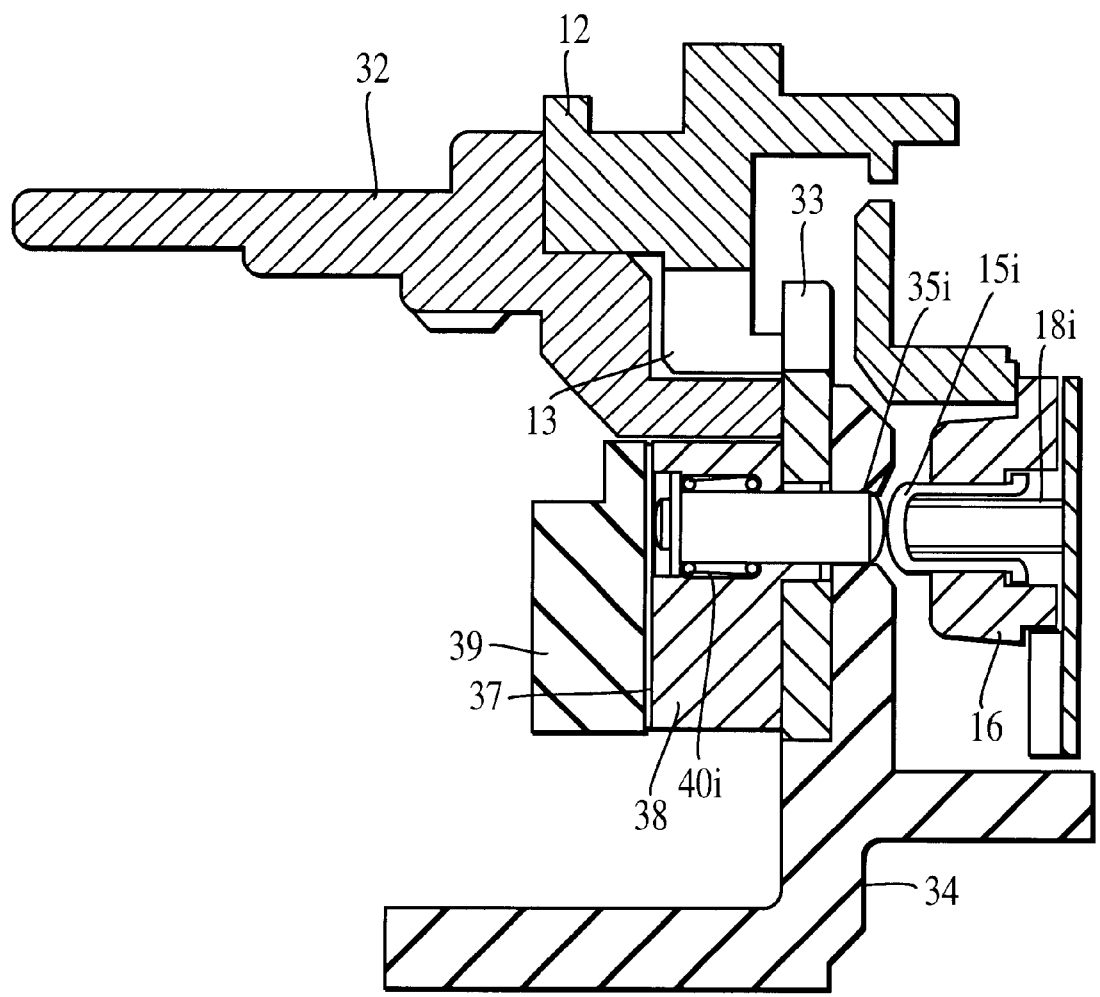
FIG. 9 is an expanded sectional view showing a state of new lens pins when the new photographic lens is attached to the new camera body.

The structure of the other lens pins 35a through 35g and 35j through 35l are the same as the lens pin 35i illustrated in FIG. 9. The lens pin 35i is incorporated in a pin hole formed in the lens pin supporting plate 38, and a spring force by a spring 40i is applied whereby the rear end of the lens pin 35i is in contact with the contact 37i of the flexible printed circuit board 37. The top of the lens pin 35i protrudes from a pin hole penetrating through the bayonet plate 33 and the flange of the protection ring 34. The lens pin 35i is not in contact with the bayonet plate 33 or any other contacts 37a through 37g and 37j through 37k.

When the new photographic lens 31 is attached to the new camera body 11, the movable lens pin 35h becomes in contact with the corresponding body pin 15h. The existence of the body pin 15h pressing the movable lens pin 35h against the elastic force of the compression spring 40h thereby moving away flange 36, and accordingly insulating the bayonet plate 33 therefrom. The body pin 15h has been inserted in a pin hole formed in a body pin supporting plate 16, and spring force is applied to the body pin 15h by a spring 18 incorporated in a space between the body pin 15h and a printed circuit board 17 fixed on the rear surface of the body pin supporting plate 16. The spring 18 is in contact with a contact formed on the printed circuit board 17, thereby the body pin 15h and the contact of the printed circuit board 17 are electrically connected to each other. The structure of the other body pins 15a through 15g and 15j through 15k are similar to that of the body pin 15h, having corresponding contacts on the printed circuit board 17 to be electrically connected to each other. These contacts are also connected to in/out terminals of the DPU 103 of the new camera body 11 via the printed circuit board 17, thus the CPU 101 controls the new photographic lens 31 through communication via the DPU 103. Accordingly, in the present embodiment, the DPU 103 serves as an interface.

Figure 4:
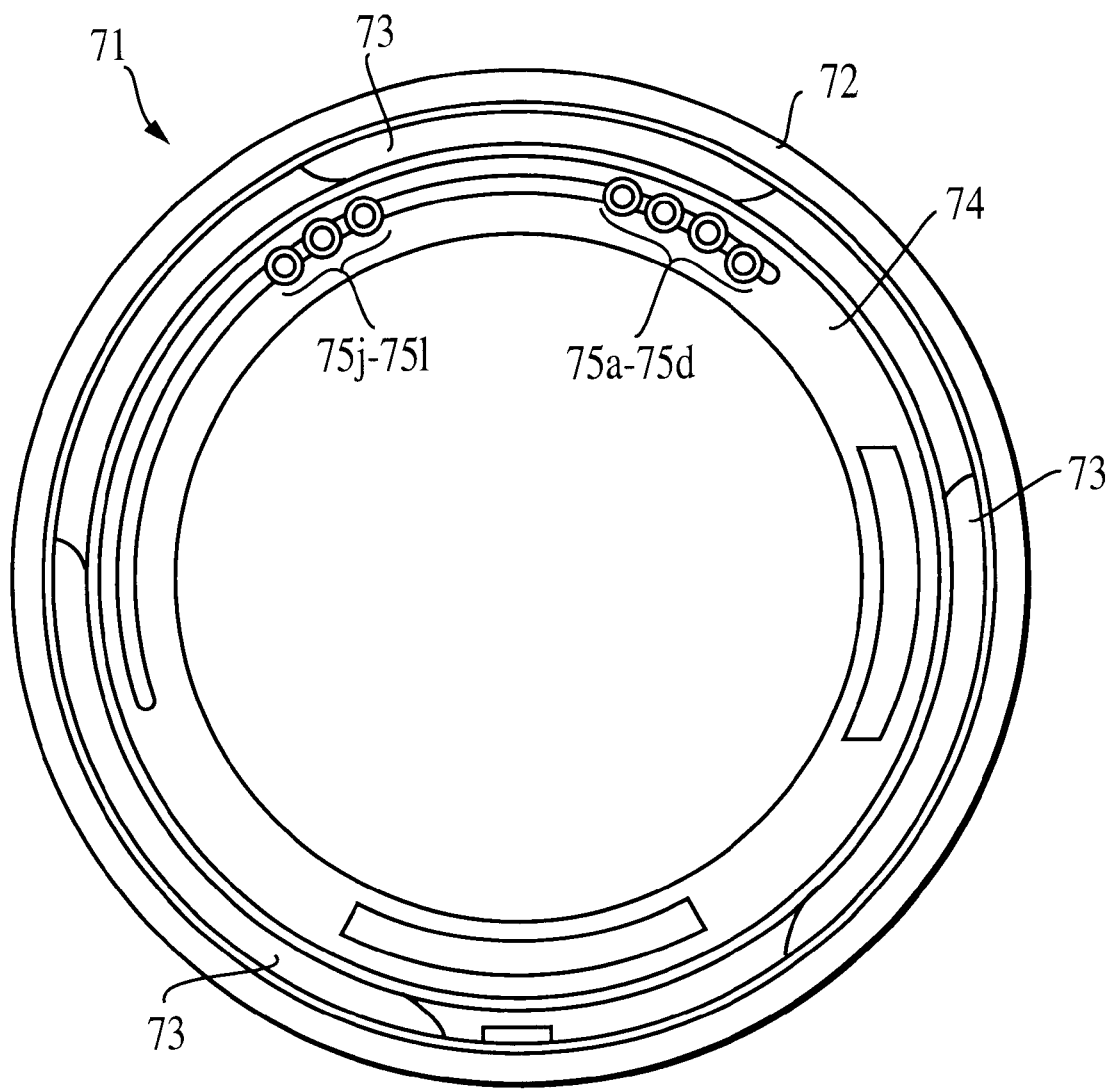
FIG. 4 is an elevational view of a lens mount of a pre-existing photographic lens of a pre-existing single-lens reflex camera.
Figure 5:
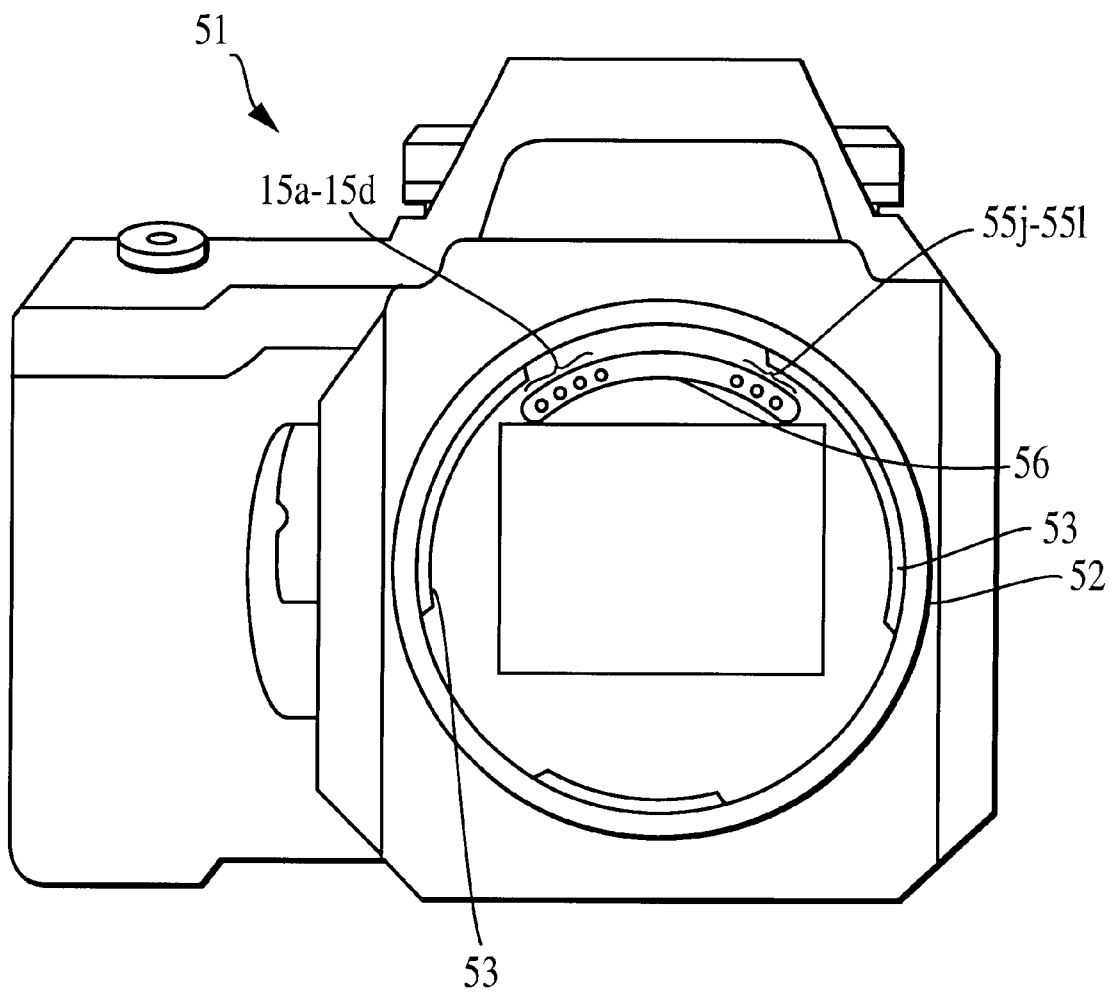
FIG. 5 is an elevational view of a lens mount of a pre-existing camera body of the pre-existing single-lens reflex camera.

The new camera body 11 and the new photographic lens 31 correspond to a body-lens communication system referred to as a second (new) communication system. Hence the camera body 51 and the photographic lens 71 as illustrated in FIGS. 4 and 5, which correspond to another body-lens communication system referred to as a first (pre-existing) communication system.

In the embodiment of the present invention, the movable lens pin 35h and the lens pin 35i of the new photographic lens 31 are utilized in order to determine the present combination among the following possibilities of combinations: a new photographic lens 31 and a new camera body 11, a new photographic lens 31 and a pre-existing camera body 51, and a pre-existing photographic lens 71 and a new camera body 11. The detailed explanation thereof will now be described with reference to FIGS. 6 through 9 and 11 through 14.

The relationship between the body pins 15a through 15l and 55a through 55l, connected to the respective interface terminals of the new camera body 11 and the pre-existing camera body 51 as illustrated in FIGS. 11 through 14, is shown as below:

15a, 55a ; Fmin2/DATA
15b, 55b; Fmin1/SCK
15c, 55c; Fmax1
15d, 55d; Fmax2
15e, - - - ; (dummy)
15f, - - - ; PGND
15g, - - - ; VLENS (VBATT)
15h, - - - ; LENS N/O
15i, - - - ; CONTL/VDD
15j, 55j; LS/ACK
15k, 55k; Fmin3/RES
15l, 55l; A/M Wherein the body pins 15a through 15d and 15j through 15l serve as contact members of the first communication system (predetermined body contact-member group-A), and the body pins 15a, 15b, 15h, 15i and 15k also serve as contact members of the second communication system (predetermined body contact-member group-B). In particular, the body pins 15h and 15i serve as the first and second contact members, the body pin 15h presses the movable lens pin 35h of the new photographic lens 31, and the body pin 15i supplies the electric power of the camera body. The body pins 15h and 15i also serve as identifying members which identify whether or not the attached photographic lens uses the second communication system.

In regard to the new photographic lens 31, the lens pins 35a through 35l serve the same functions as those of the corresponding body pins 15a through 15l. Namely, the lens pins 35a through 35d and 35j through 35l serve as contact members of the first communication system predetermined lens contact-member group-A, and the lens pins 35a, 35b, 35h, 35i and 35k also serve as contact members of the second communication system (predetermined lens contact-member group-B). In particular, the movable lens pin 35h and the lens pin 35i serve as the first and second contact members. When the new photographic lens 31 is attached to the new camera body 11, the movable lens pin 35h is pressed by the body pin 15h; hence the movable lens pin 35h is moved away and insulated from the bayonet plate 33, and the lens pin 35i receives a predetermined amount voltage of electric power supplied from the body pin 15i. The lens pins 35h and 35i also serve as identifying members which identify whether or not the attached photographic lens uses the second communication system.

[New Photographic Lens—New Camera Body]

When the new photographic lens 31 is attached to the new camera body 11, the lens pins 35a through 35l are respectively in contact with the corresponding body pins 15a through 15l. The movable lens pin 35h is pressed by the body pin 15h, moved away from the bayonet plate 33 (see FIGS. 6 and 11(A)) insulating therefrom. Thus the body pins 15h and 15i are electrically connected to each other via the electrically connected lens pins 35h and 35i, and the level of electric potential (hereinafter simply referred to as "level") of body pin 15h becomes the same as that of the body pin 15i. Accordingly, when the level of one of the body pins 15h or 15i is changed, since the level of the corresponding body pin 15h or 15i has also changed by the same value, the new camera body 11 can identify that the new photographic lens 31 is attached thereto.

[New Photographic Lens—Pre-existing Camera Body]

Figure 12A:
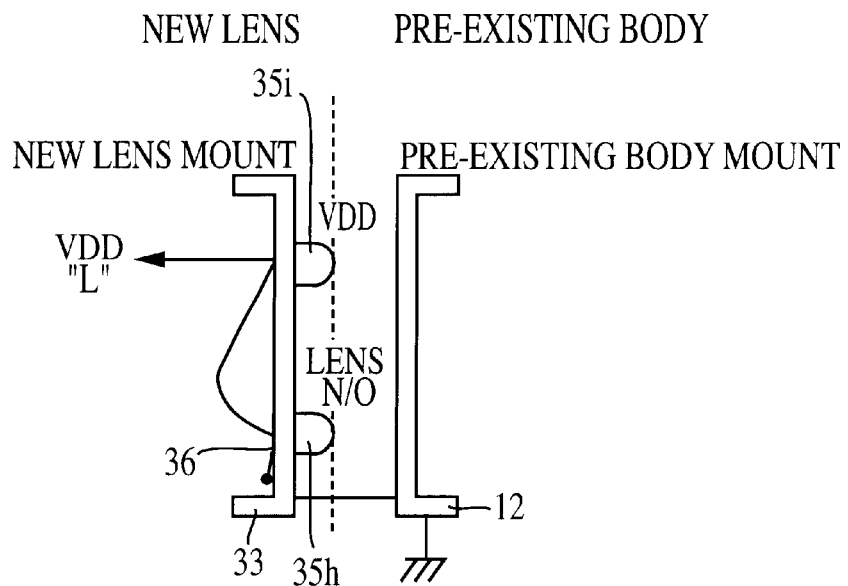
FIGS. 12(A) and (B) are views showing states of the new lens pins when the new photographic lens is attached to a pre-existing camera body.
Figure 12B:
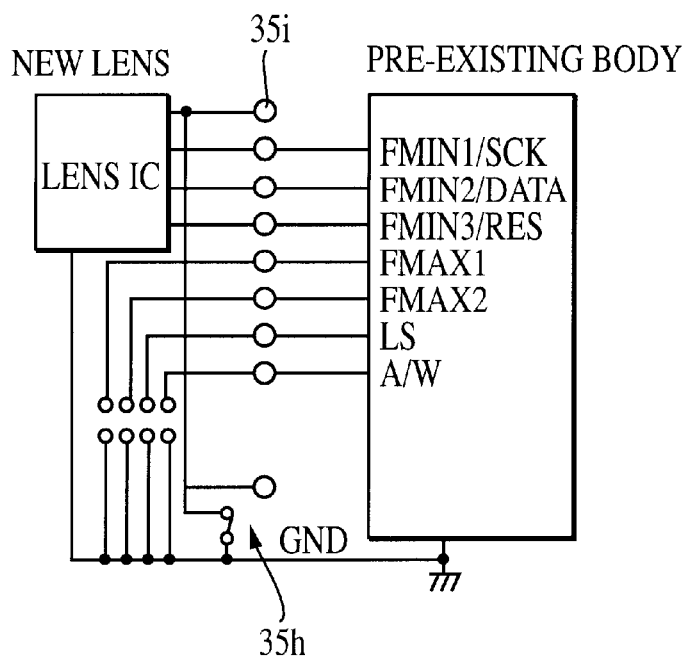

When the new photographic lens 31 is attached to the pre-existing camera body 51, the lens pins 35e through 35i which are provided on the new photographic lens 31 become in an out-of-contact state (see FIGS. 7 and 12(A)). The movable lens pin 35h becomes grounded on the bayonet plate 33, hence the IC circuit of the new photographic lens 31 is completely turned OFF.

However, the remaining lens pins 35a through 35d and 35j through 35l, which have also been provided on the former type of photographic lens (pre-existing photographic lens) come in contact with the corresponding body pins 55a through 55d and 55j through 55l of the pre-existing camera body 51. Thus, the former type of communication (the first communication) can be carried out by using the pre-existing lens pins 35a through 35d and 35j through 35l, and the body pins 55a through 55d and 55j through 55l.

[Pre-existing Photographic Lens—New Camera Body]

Figure 8:
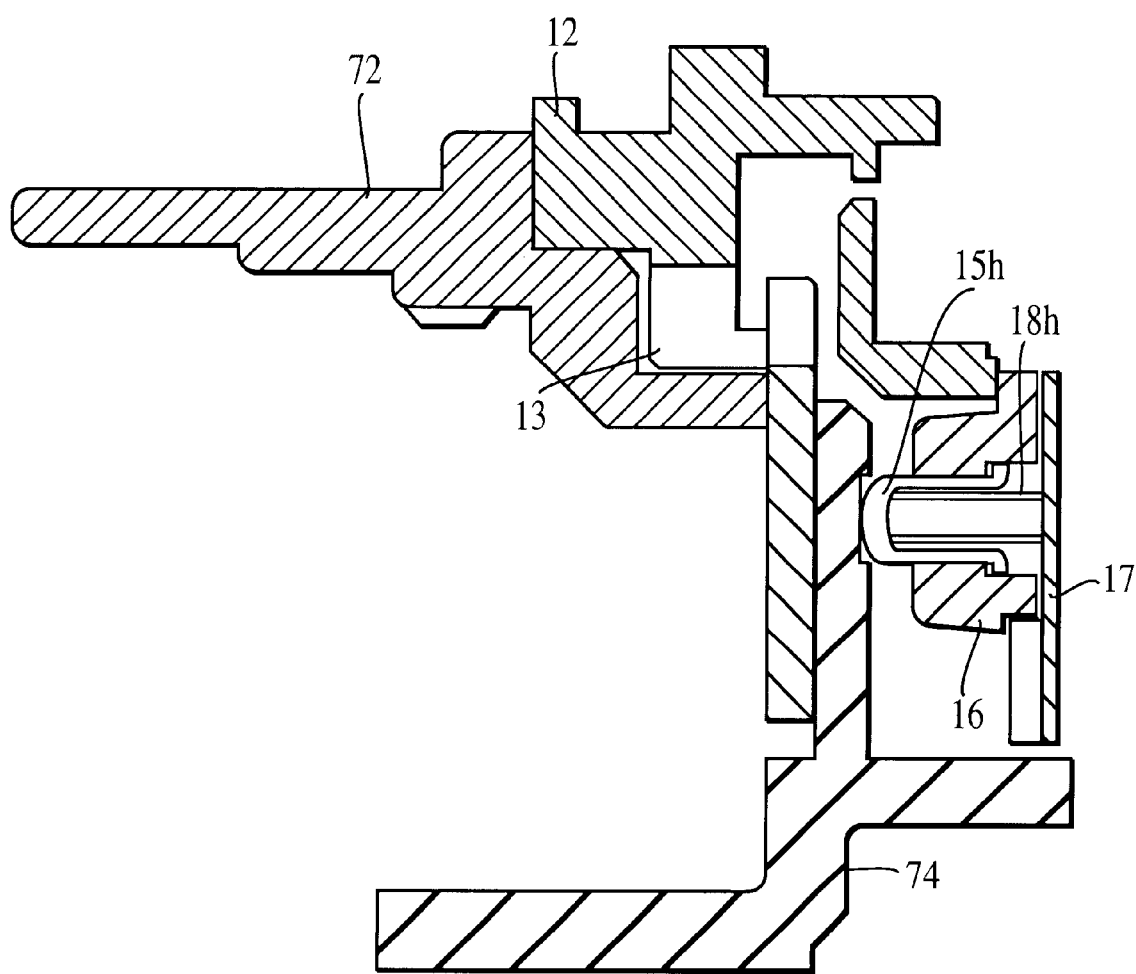
FIG. 8 is an expanded sectional view showing a state of body pins which may be in contact with the movable lens pins when a pre-existing photographic lens is attached to the new camera body.
Figure 13A:
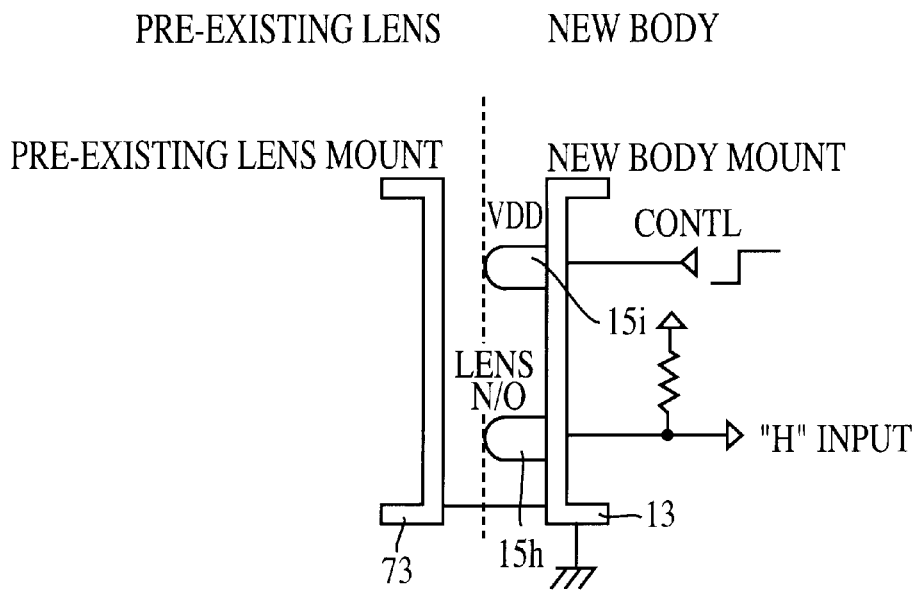
FIGS. 13(A) and (B) are views showing states of the new body pins when a pre-existing photographic lens is attached to the new camera body.
Figure 13B:
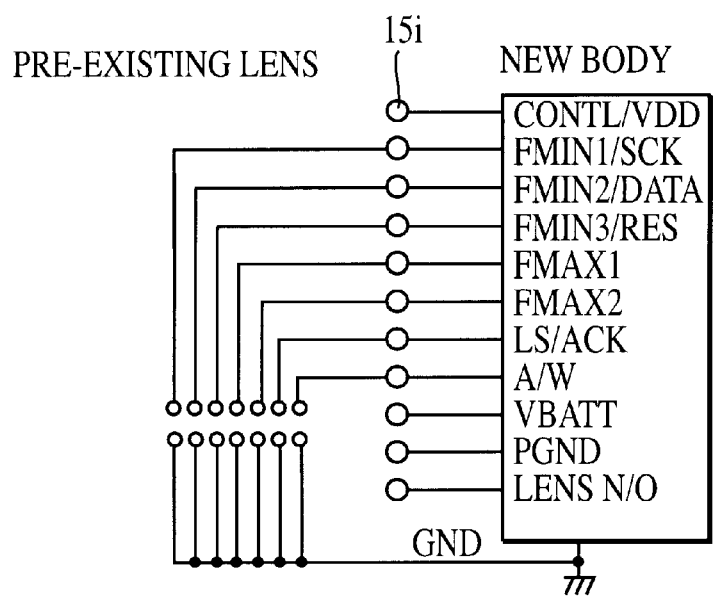

When the pre-existing photographic lens 71 is attached to the new camera body 11, the body pins 15e through 15i which are provided on the new camera body 11 become in an out-of-contact state (see FIGS. 8 and 13(A)). Since the body pins 15h and 15i become independent of each other, when the level (of the electric potential) of one of the body pins 15h or 15i is changed, since the level of the corresponding body pin 15h or 15i has not changed by the same value, the new camera body 11 can identify that the pre-existing photographic lens 71 is attached.

However, the remaining body pins 15a through 15d and 15j through 15l, which have also been provided on the former type of camera body (pre-existing camera body) come in contact with the corresponding lens pins 75a through 75d and 75j through 75l of the pre-existing photographic lens 71. Thus the former type of communication (the first communication) can be carried out by using the formerly provided body pins 15a through 15d and 15j through 15l, and the lens pins 75a through 75d and 75j through 75l.

[Pre-existing Photographic Lens—Pre-existing Camera Body]

Figure 14A:
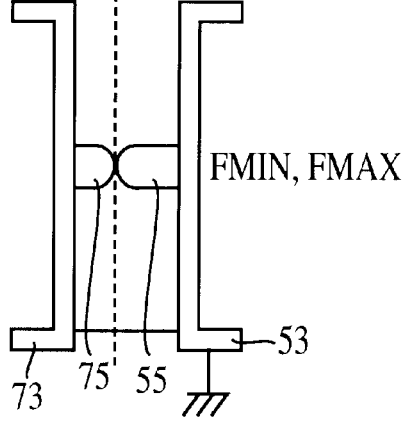
FIGS. 14(A) and (B) are views showing states of the lens pins and the body pins when a pre-existing photographic lens is attached to a pre-existing camera body.
Figure 14B:
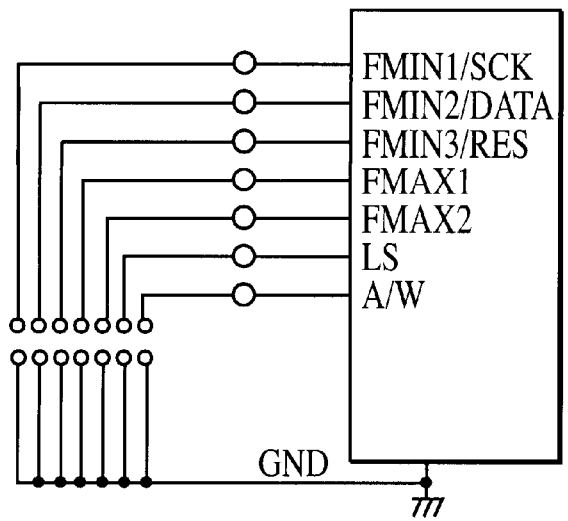

When the pre-existing photographic lens 71 is attached to the pre-existing camera body 51, the lens pins 75a through 75d and 75j through 75l of the pre-existing photographic lens respectively become in contact with the corresponding body pins 55a through 55d and 55j through 55l of the pre-existing camera body, as what have been in the former type of camera system (see FIG. 14(A)), hence the former type of communication (the first communication) can be carried out.

Figure 15:
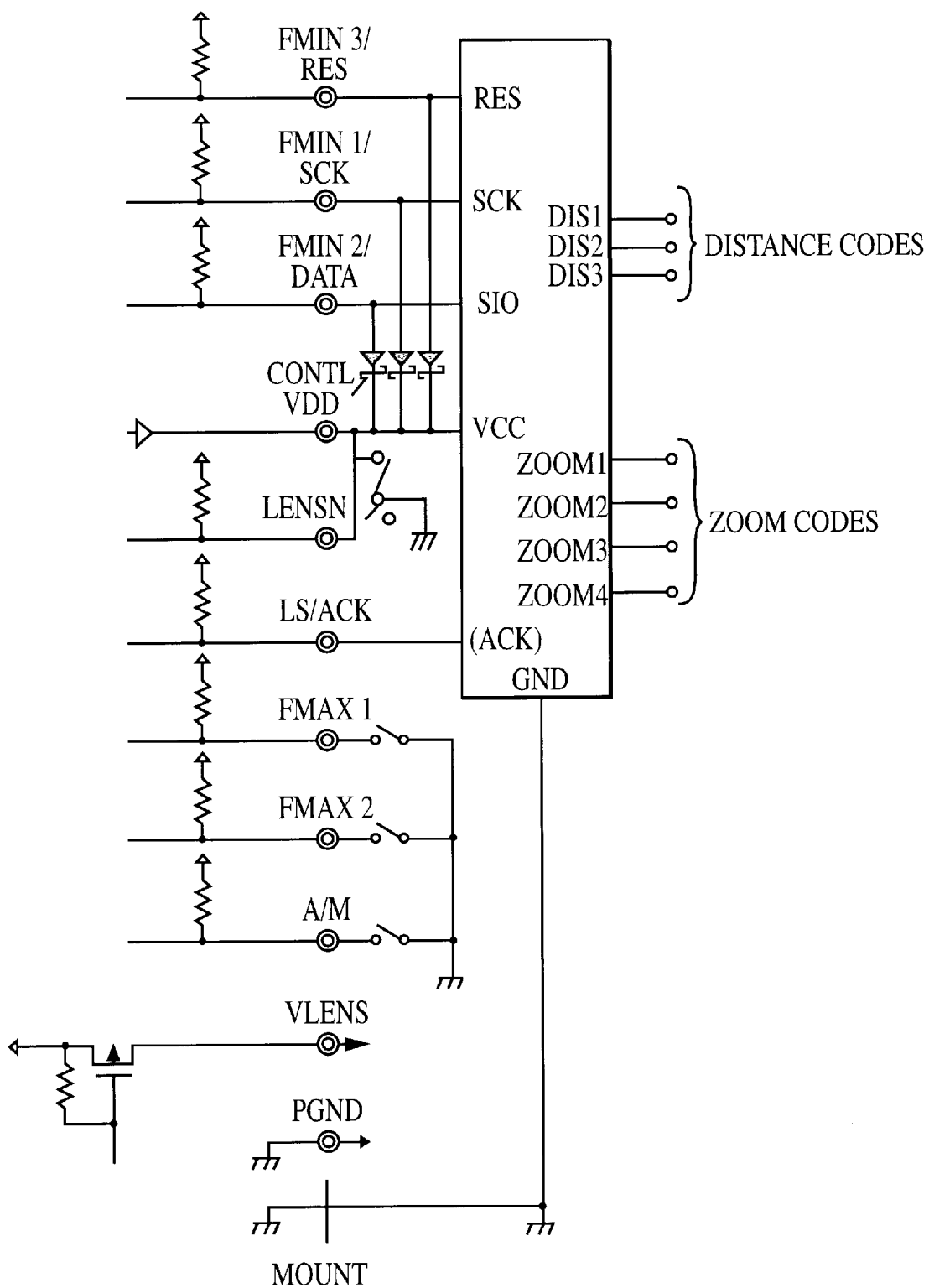
FIG. 15 is a view showing relations of in/out terminals of the new photographic lens to the lens pins.

FIG. 15 illustrates a block diagram of in/out terminal circuits of the new photographic lens 31. The present embodiment may be applied to the lens IC 303 provided with the ROM 303a, and to any other electronic circuit provided with a CPU. The lens IC 303 communicates with the camera body, receives electric power, inputs the distance code from three input terminals DIS1 through DIS3, and inputs the zoom code from four input terminals ZOOM1 through ZOOM4, via four in/out terminals (a reset terminal RES, a serial clock terminal SCK, a serial data in/out terminal SIO, and a power supply terminal VCC) of the lens IC 303.

The reset terminal RES for camera communication is connected to the lens pin 35k (Fmin3/RES), the serial clock terminal SCK is connected to the lens pin 35b (Fmin1/SCK), the serial data in/out terminal SIO is connected to the lens pin 35a (Fmin2/DATA), and a power supply terminal VCC is connected to the lens pin 35i (CONTL/VDD).

The terms 'reset pin' and 'identifying pin' defined in the claims of the present invention correspond to the lens pin 35k (Fmin3/RES terminal) and the lens pin 35a (Fmin2/DATA terminal) of the embodiment, respectively.

An acknowledge terminal ACK will be used in the case that a lens CPU is incorporated instead of the lens IC, and the terminal ACK is not used when the lens IC 303 is incorporated. If the lens CPU is incorporated after turning the power ON, an oscillator begins oscillation. When stable oscillation is obtained, the level at the terminal ACK is lowered once during execution of an initialize program. After completion of the initialization, the level at the terminal ACK rises again in order to inform the stand-by state of the photographic lens to the camera body. Thus the camera body 11 identifies that the photographic lens provided with the CPU is attached, and the operation code transmission and other data transmission are carried out between the new photographic lens with CPU and the new camera body 11.

The lens pin 35k (Fmin3/RES), the lens pin 35b (Fmin1/SCK) and the lens pin 35a (Fmin2/DATA) are each connected to the lens pin 35i (CONTL/VDD) via Schottky barrier diodes according to a code corresponding to the open aperture F-number of the photographic lens. When the new photographic lens 31 is attached to a pre-existing camera body 51, since the movable lens pin 35h is grounded, the lens pin 35i (CONTL/VDD) is also grounded. Thus, each level of the lens pin 35k (Fmin3/RES), the lens pin 35b (Fmin1/SCK) and the lens pin 35a (Fmin2/DATA) which are connected to the lens pin 35h (CONTL/VDD) via the Schottky barrier diodes; becomes lower due to forward-voltage-drop amount VF of the Schottky barrier diode and the disconnected terminal of the Schottky diode becoming high. Accordingly, open aperture F-number data can be sent to the pre-existing camera body.

When the new photographic lens 31 is attached to the new camera body 11, the movable lens pin 35h is moved away from the bayonet plate 33, and the electric potential of the movable lens pin 35h becomes the same as that of the lens pin 35i. The new camera body 11 supplies the electric power VDD to the lens pin 35i, thus all the Schottky barrier diodes of the lens pin 35k (Fmin3/RES), the lens pin 35b (Fmin1/SCK) and the lens pin 35a (Fmin2/DATA) become in an out-of-connection state; thereby the serial communication via the above-mentioned lens pins can be carried out. Although the Schottky barrier diode is advantageous in order to secure a minimum effect on the forward-voltage-drop amount VF, as long as the threshold for identifying the lower level of the circuit of the camera body is sufficiently high, it is also possible to use an ordinary type of diode.

In order to transmit the minimum F-number to the pre-existing camera body 51, the lens pin 35c and/or the lens pin 35d (Fmax1, Fmax2) are grounded according to the minimum F-number. The lens pin 35l which determines whether the present mode is an auto-mode aperture or a manual-mode aperture, and is in either a grounded or a floating state according to the state of an aperture ring.

In a new photographic lens 31 having a lens IC, there are two kinds: one kind which has a lens CPU which can independently control various calculation operations in the photographic lens, and another kind which does not have a lens CPU (henceforth will be referred to as an LROM). When the new photographic lens is attached to a camera body, it is necessary (after it is determined that a second communication is allowed) to determine (via the second communication) whether or not the newly attached photographic lens is a lens having a CPU or not.

Figure 16:
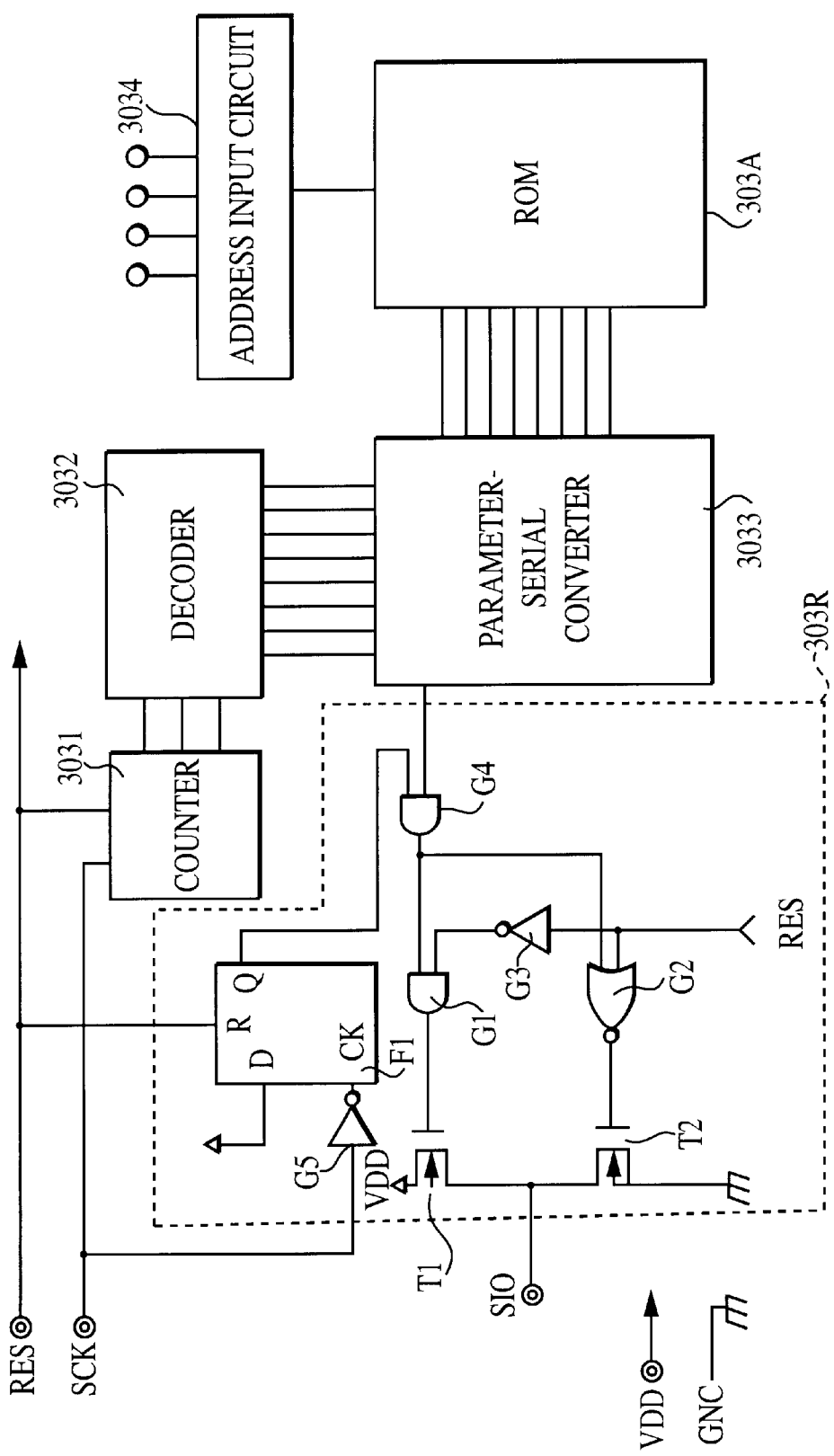
FIG. 16 is a block diagram of main parts of an in/out circuit of the new photographic lens.
Figure 17:
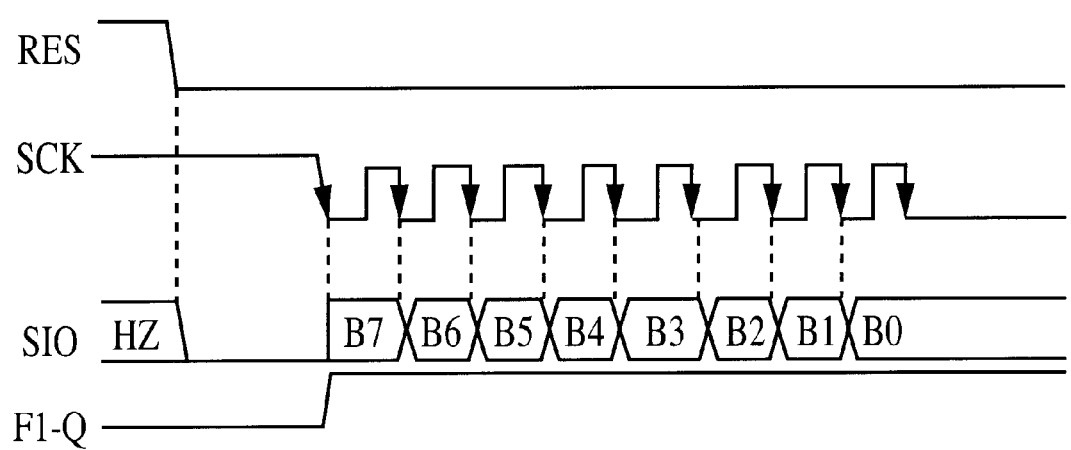
FIG. 17 is a timing chart of in/out timing of the in/out circuit.

FIG. 16 illustrates an essential part of the in/out circuit of the lens IC 303 of the new photographic lens 31; wherein the new photographic lens 31 is not provided with a CPU. FIG. 17 illustrates a timing chart of the data transmission. In regard to the new photographic lens 31 incorporating the ROM 303a, as shown in FIG. 16, there is a response circuit 303R which serves as a response device in order to lower the output level of the serial data in/out terminal SIO when the signal level input in the reset terminal RES is changed from high (a reset signal) to low (a reset release signal). The response circuit 303R includes a D flip-flop F1, inverters G3 and G5, AND gates G1 and G4, a NOR gate G2, and transistors (n-channel FET) T1 and T2. If the lens IC is the lens CPU, although not shown, response circuit 303R is not provided, and instead, each of the terminals Fmin3/RES, Fmin1/SCK, Fmin2/DATA and CONTL/VDD is directly connected to the corresponding port of the lens CPU.

The terms 'first switch' and 'second switch' defined in the claims of the present invention correspond to the transistors T1 and T2 of the embodiment, respectively.

When electric power (voltage) VDD is supplied, and if the level of the reset terminal RES is high, the input level of the inverter G3 is high and the output level becomes low. Similarly, one of the input levels of the NOR gate G2 is high and the output level becomes low; one of the input levels of the AND gate G1 is low and the output level is also low. Thus the levels of the transistors T1 and T2 are both low (OFF states), hence the impedance of the serial data in/out terminal SIO is high. In this state, when the level of the reset terminal RES is lowered, the input level of the AND gate G4 is low and the output level is also low; and the input levels of the NOR gate G2 are both low and the output levels are high. Thus the transistor T2 changes to the ON state, hence the level of the serial data in/out terminal SIO is lowered.

When the level of the reset terminal RES is low, if the serial clock is input to the serial clock terminal SCK, the signal level of a Q output of the D flip-flop F1 changes from low to high synchronization with the first trail of the serial clock from the serial clock terminal SCK. The serial clock is also input to a counter 3031, and the 1-byte data obtained via a decoder 3032 and a parameter-serial converter 3033 is then read from the ROM 303a. Thereafter the 1-byte data becomes subject to serial conversion, and is input to one input-signal port of the AND gate G4. Since the Q output of the D flip-flop F1 has also been input to the other input-signal port of the AND gate G4, after the first trailing of the serial clock, the output of the parameter-serial converter 3033 is output from the AND gate G4.

When the level of the AND gate G4 is high, one of the input levels of the AND gate G1 is high, and the other input level is also high since the low-level input in the RES terminal has been converted by the inverter G3. Thus the output level of the AND gate G1 becomes high; and hence, the transistor T2 changes to the OFF state, and the transistor T1 changes to the ON state, and the high-level data are output from the serial data in/out terminal SIO. When the output level of the AND gate G4 is low, the output level of the NOR gate G2 becomes high and the transistor T2 changes to the ON state, the other output level of the AND gate G1 is low and the transistor T1 changes to the ON state. Therefore the low-level data are output from the serial data in/out terminal SIO.

As discussed above, when the signal level of the reset terminal RES is high, the serial data in/out terminal SIO is in a high-impedance state, thus the high-level signal is obtained due to the pull-up resistance of the camera body. Subsequently, when the level of the reset terminal RES is low, the level of the serial data in/out terminal SIO also becomes low; and when the serial clock is input in the serial clock terminal SCK, data is continuously output from the serial data in/out terminal SIO (see FIG. 17).

When the data is read from the ROM 303a, the code signal input from the zoom code plate 306 is latched as an address at an address input circuit 3034.

It is known per se that lens IC (ROM IC) requires a shorter start-up time than a CPU. For example, when the power is turned ON, the CPU firstly initializes the incorporated RAMs or terminals during stand-by time for the stable oscillation, then the CPU is ready to accept commands. Accordingly, during the start-up time of the CPU before the CPU gets ready to respond to any command accurately, it was impossible to determine whether the present camera system incorporates the lens ROM or the CPU.

Therefore, in the present embodiment, in a photographic lens which does not have a lens CPU (in other words, a photographic lens provided with a ROM), by providing the response circuit 303R, the output speed of the return signals to the control signals that come from the CPU of the camera body are purposely increased. Therefore, since the CPU in the camera body can determine whether the attached photographic lens has a CPU or not, according to the difference in the speed of the return signals; the camera CPU can determine in a shorter time whether the new photographic lens attached has a ROM IC, without considering the start-up time of the photographic lens CPU. Accordingly, the control of each operation of this camera system will now be described with reference to flow charts of FIGS. 18 through 26.

Figure 18:
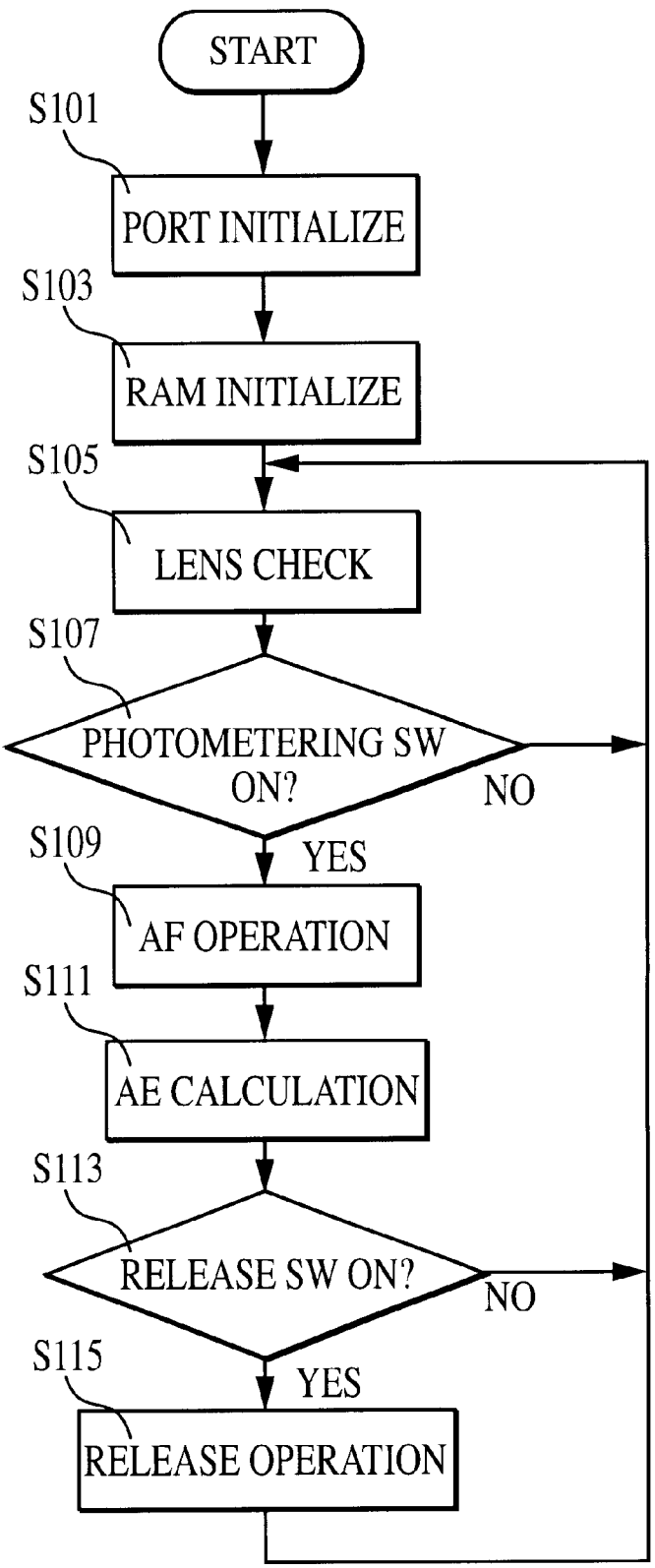
FIG. 18 is a flow chart of a main operation of the new camera body according to the present invention.

FIG. 18 is a flow chart showing an outline of a main operation of the camera body according to the present invention. A control enters this main operation when the main switch is turned ON. When the main operation is started, the terminals of both the CPU 101 and the DPU 103 are initialized, and the RAM is also initialized (steps S101, S103).

Then the control enters a lens check operation at step S105, which is one of the most characteristic part of the present invention. The lens check operation identifies whether the attached lens is for the first communication or for the second communication, and also identifies the detailed information thereof.

After the lens is identified at steps S105, a check is made to determine whether or not the photometering switch is turned ON; if the photometering switch is not ON, the control is returned to the lens check operation (S107, N; S105); otherwise, if the photometering switch is turned ON, an AF operation and an AE calculation operation are executed (S107, Y; S109; S111). Subsequently, if the release switch is not turned ON, the control directly returns to step S105 (S113, N; S105); and if the release switch is turned ON, the release operation is executed at step S115 and the control is returned to step S105 (S113, Y; S115; S105).

Figure 19:
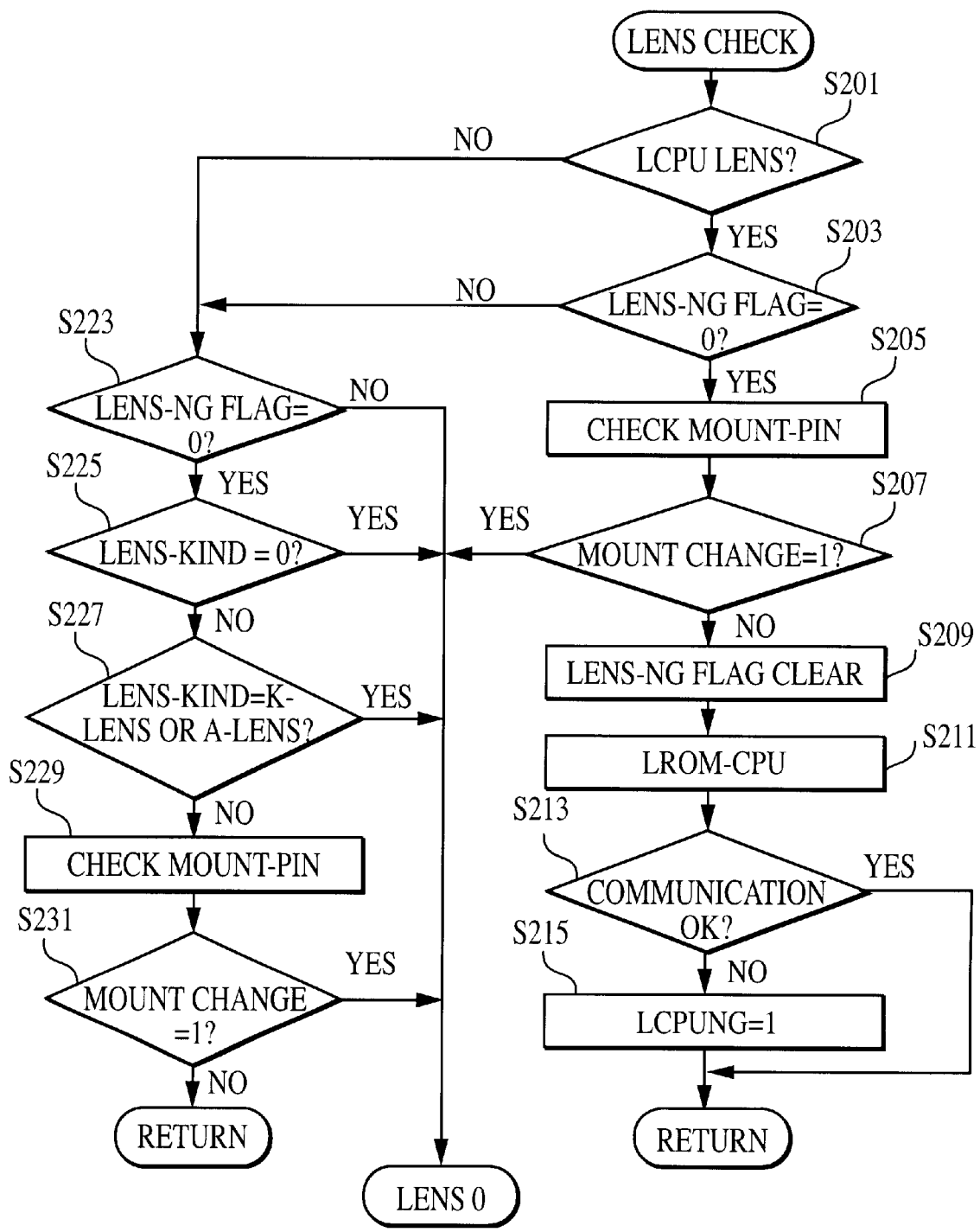
FIG. 19 is a flow chart of a lens check operation of the new camera body according to the present invention.
Figure 20:
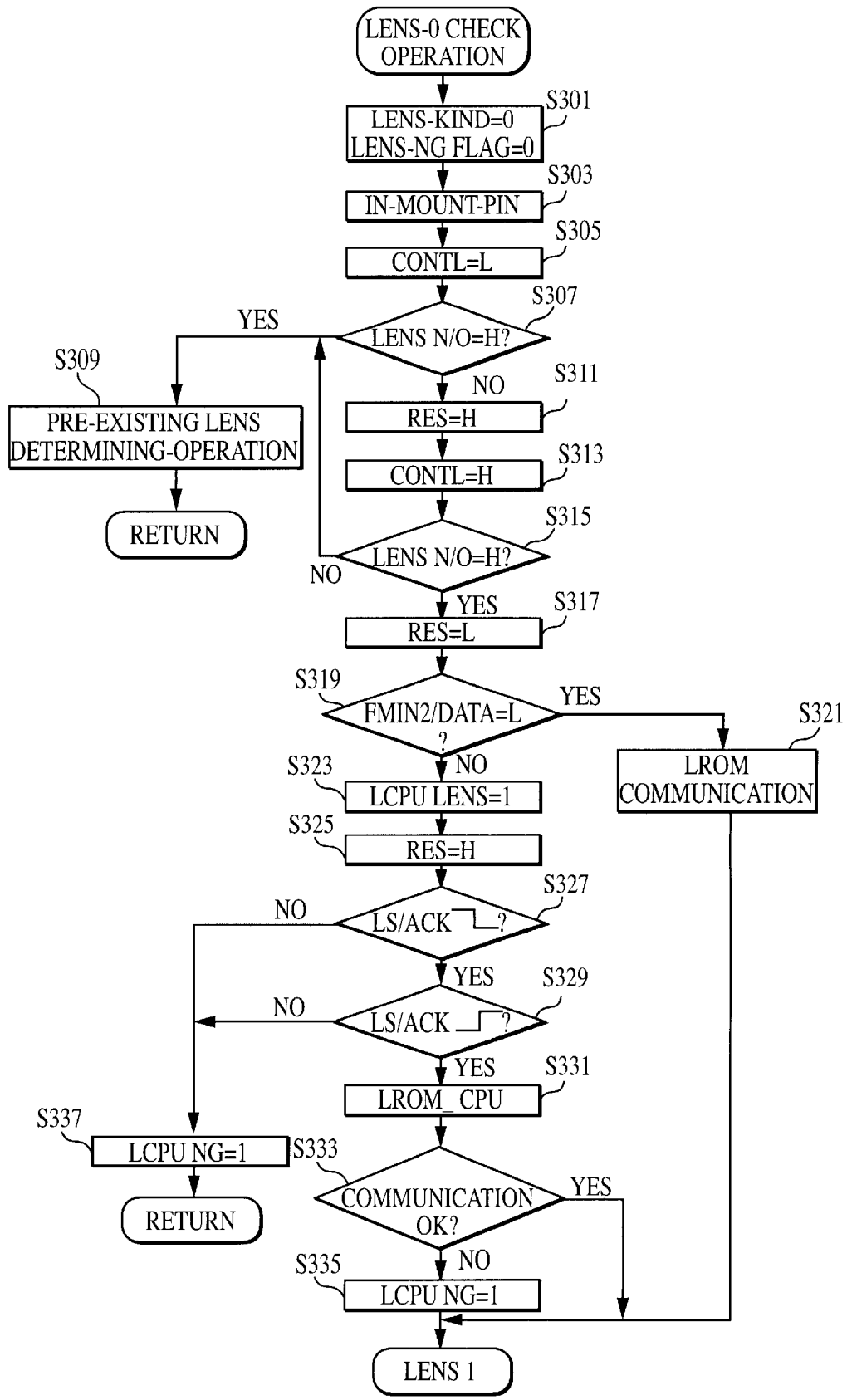
FIG. 20 is a flow chart of a LENS-0 check operation of the new camera body according to the present invention.

FIGS. 19 and 20 are flow charts by which the type of attached photographic lens (lens-kind) is identified.

When the control enters the lens check operation, firstly, a check is made at step S201 to determine whether or not the photographic lens is provided with the lens CPU (hereinafter "LCPU lens"). Since the type of lens is unidentified at the first stage, the control proceeds to step S223 (S201, N; S223). If the LCPU lens is identified, a check is made at step S203 to determine whether the lens-NG flag is set to "0", and if the lens-NG flag is set to "0," the control proceeds to step S205 (S201, Y; S203, Y; S205). If the attached lens is not a LCPU lens, or when the attached lens is a LCPU lens but the lens-NG flag is set to "0," the control proceeds to step S223 (S201, N; S223) or (S201, Y; S203, N; S223).

A mount-pin checking operation is executed at step S205. The mount-pin checking operation checks if there is any change of mount level at the terminals Fmax1 and Fmax2 at step S503, by the input of the mount levels Fmax1, Fmax2, A/M and LS at step S501 (see a flow chart of FIG. 22). If there is any change, the mount change flag is set to "1" (S503, Y; S505), and if there is no change, the mount flag is set to "0" (S503, N; S507).

In the mount-pin checking operation, if a change of the mount level is detected, the control proceeds to the LENS-0 check operation (S207, Y). If no change of the mount level is detected, the lens-NG flag is cleared, then the control checks whether or not the lens ROM communication can be carried out by the lens CPU (S211, S213). If the communication state is not OK, the LCPU-NG flag which determines the inability state of communication is set to "1", and the control is returned (S211; S213, N; S215). Conversely, if the communication state is OK, the control skips step S215 and returns (S213, Y).

After completion of the checks executed at steps S201 and S203, when the control proceeds to step S223 (S201, N; S223) or (S201, Y; S203, N; S223), a check is made to determine whether or not the lens-NG flag is set to "0". If the lens-NG flag is not set to "0," the control proceeds to the LENS-0 check operation (S223;N). If the lens-NG flag is set to "1," a check is made to determine whether or not the present type of lens ("lens-kind") is a 0-type. If the lens-kind is not the 0-type, then a check is made to determine whether the lens-kind is a K-type or an A-type. If the lens is either the K-type or the A-type, the control also proceeds to the LENS-0 check operation (S225, N; S227, Y). If the lens is a 0-type, the mount-pin checking operation is then executed (S225, N; S227, N; S229). Subsequently, a check is made to determine whether the mount-change flag is set to "1", and if the mount-change flag is "1", the LENS-0 check operation is executed (S229; S231, Y). If the mount change flag is not set to "1" the control is returned (S231,N).

The LENS-0 check operation will now be described with reference to the flow chart of FIG. 20. The LENS-0 check operation checks whether the attached photographic lens is a pre-existing lens or a new lens, and also checks for a lens IC or a lens CPU.

When the control enters the LENS-0 check operation as shown in FIG. 20, the lens-kind data and the lens-NG flag are both set to "0" and the control proceeds to the mount-pin input-operation at step S303 (S301, S303). The mount-pin input-operation checks if there is any change at the terminals Fmax1 and Fmax2 at step S553, via the input of the mount levels at Fmax1, Fmax2, Fmin1, Fmin2, Fmin3, A/M and LS at step S551 (see flow chart in FIG. 23). If there is any change, the mount change flag is set to "1" (S553, Y; S555); if there is no change, the mount flag is set to "0" (S553, N; S557).

The level of the terminal CONTL is lowered (grounded), and a check is made to determine whether the level of the terminal LENS N/O has become high (S305, S307). If the level is high, the attached photographic lens is identified as the pre-existing photographic lens as illustrated in FIG. 13(A); therefore the pre-existing lens determining-operation at step S309 is executed, and the control is returned (S307, Y; S309).

In the pre-existing lens determining-operation, a check is made to determine whether a photographic lens is attached;

and if a photographic lens is attached, a check is made to determine whether the attached lens is a "K-lens" (which does not have open aperture information or minimum aperture information) or an "A-lens" (which has an open aperture information and a minimum aperture information).

Figure 24:
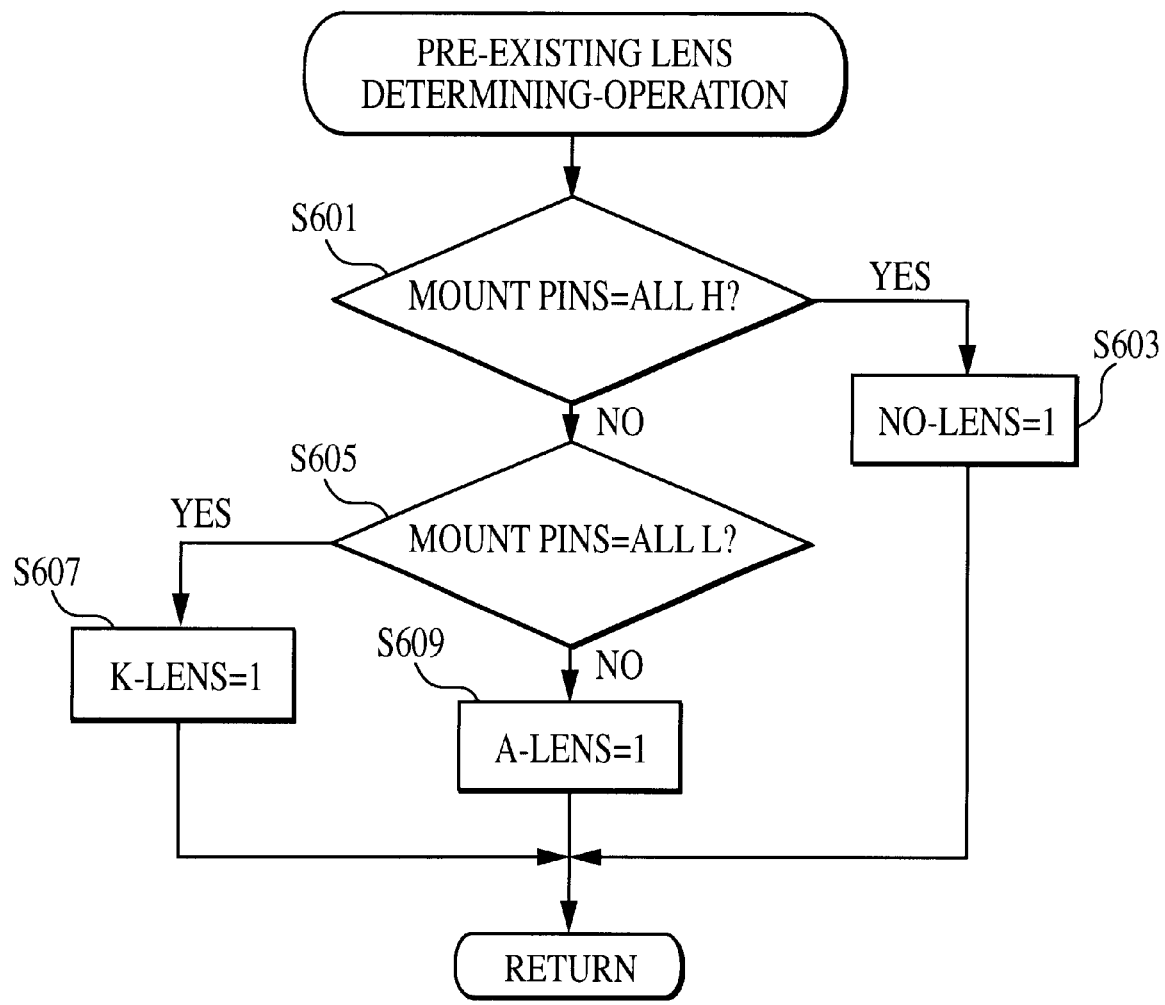
FIG. 24 is a flow chart of a pre-existing lens checking-operation of the new camera body according to the present invention.

The pre-existing lens determining-operation is illustrated in the flow chart of FIG. 24. Firstly, a check is made to determine whether or not the levels of the body pins (mount input terminals) are all high. If the levels are all high, then the body pins 15a through 15l are not in contact with the corresponding lens pins. Thus the No-lens flag is set to "1" and the control is returned (S601;Y, S603). However, if the level of any of the body pins is not high (that is, if one body pin is at a low-level), a check is made to determine whether or not the levels of the other body pins are all low. If the levels of the body pin are all low, the K-lens flag is set to "1" (S601, N; S605, Y; S607). If the level of all the body pins are not low, the A-lens flag is set to "1" and the control is returned (S601, N; S605,N; S609).

Figure 11A:
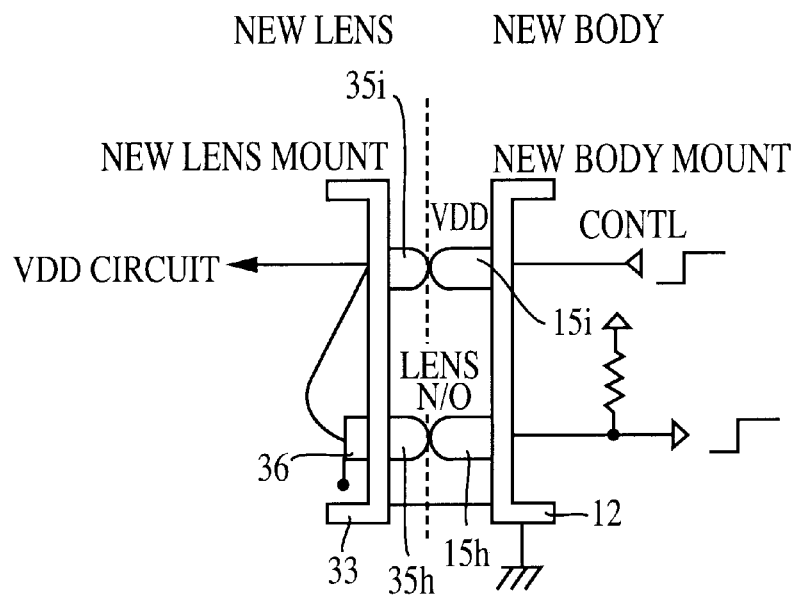
FIGS. 11(A) and (B) are views showing states of the new lens pins and new body pins when the new photographic lens is attached to the new camera body.
Figure 11B:
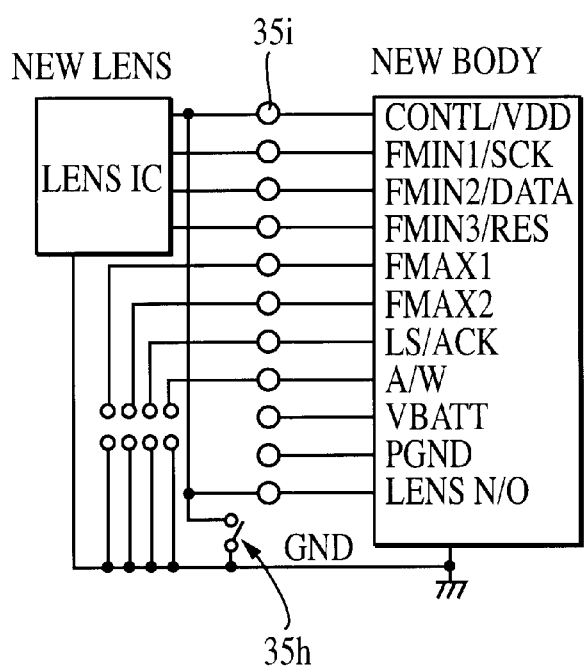

Referring back to FIG. 20, if the level of the terminal LENS N/O is not high at step S307, the control raises the levels of the terminals RES and CONTL/VDD, and checks whether or not the level of the terminal LENS N/O has increased to a high level (S307, N; S311; S313; S315). If the new photographic lens as illustrated in FIG. 11(A) is attached, the level of the terminal LENS N/O at step S315 is the same as that of the terminal CONTL/VDD. Accordingly, if the level of the terminal LENS N/O is also high, the attached lens is determined as a new photographic lens, and the control proceeds to step S317 (S315, Y; S317). Conversely, if the level of the terminal LENS N/O is not high, it is doubtful whether the attached lens is a new photographic lens, hence the control proceeds to step S309 to execute the pre-existing lens determining-operation (S315, N; S309).

The level of the reset terminal RES is lowered at step S317, and a check is made at step S319 to determine whether or not the level of the terminal Fmin2/DATA (SIO) is low. If the level of the terminal Fmin2/DATA is low, the attached lens is determined as the new photographic lens incorporating the ROM IC as illustrated in FIG. 16, the control executes the LROM communication as illustrated in FIG. 20, and the control is returned (S319, Y; S321).

If the level of the terminal Fmin2/DATA is not low, the attached lens is determined as the new photographic lens incorporating the lens CPU. Thus the LCPU-lens flag, which identifies that the lens incorporates the lens CPU, is set to "1" and the level of the terminal RES is risen to a high level (S319, N; S323; S325). Then the level of the terminal LS/ACK is lowered, and the control waits for the rising of the level in the timer-loop operation (S327, S329).

If the once lowered level of terminal LS/ACK does not rise again within a predetermined time, the LCPU-NG flag, which identifies an abnormal state, is set to "1" and the control is returned (S327, N; S337) or (S327, Y; S329, N; S337).

Conversely, if the once lowered level of terminal LS/ACK rises again within the predetermined time, the lens CPU is in a normal state; thus the control proceeds to step S331 to carry out communication between the LROM and the CPU (S327, Y; S329, Y; S331). When the normal communication can be carried out, the control proceeds to the LENS-1 check operation (S333;Y). Conversely, when the normal communication cannot be carried out, the LCUP-NG flag which identifies the abnormal state of the lens CPU is set to "1" then the control proceeds to the LENS-1 check operation S333, N; S335).

Figure 21:
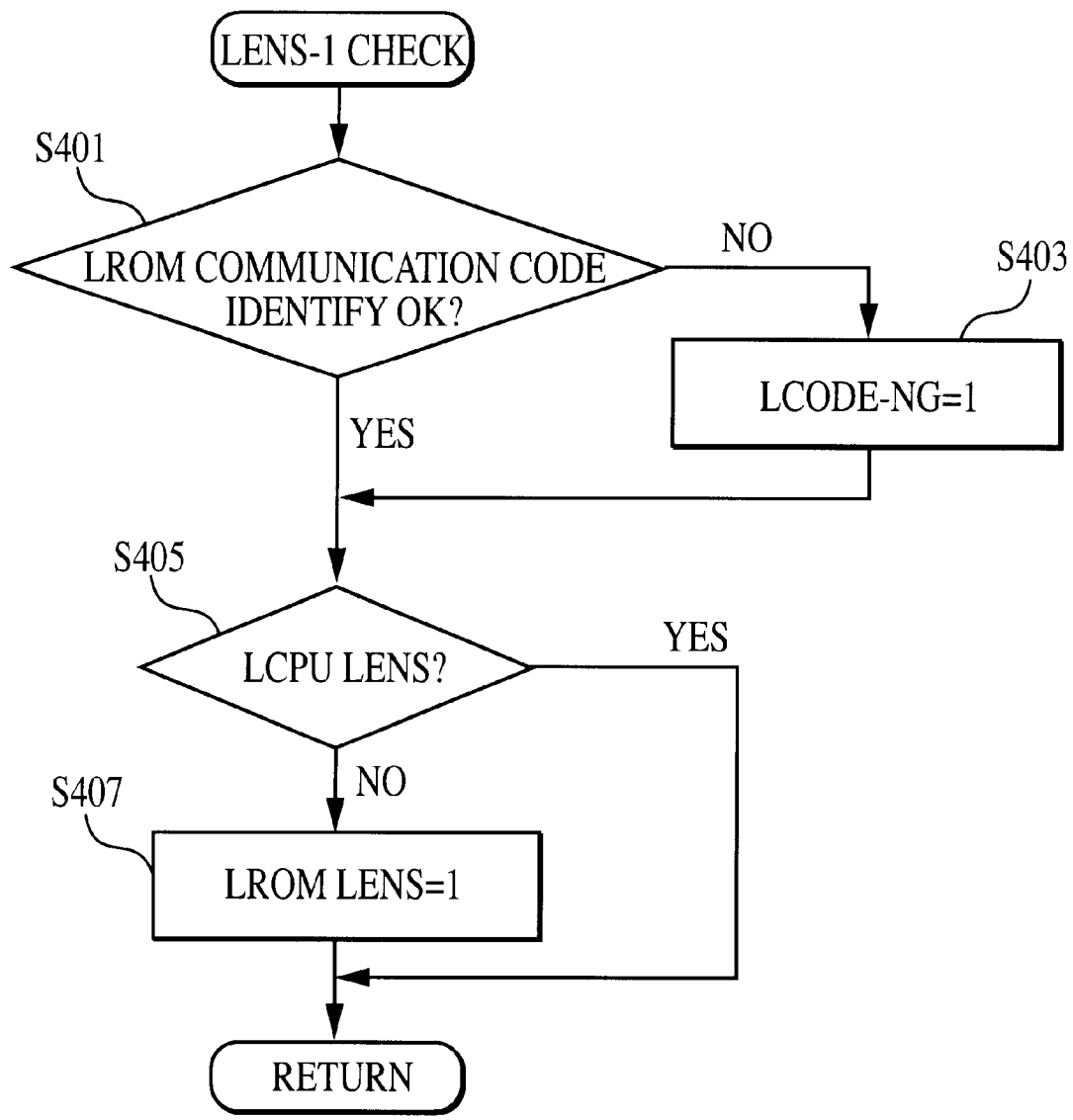
FIG. 21 is a flow chart of a LENS-1 check operation of the new camera body according to the present invention.
Figure 22:
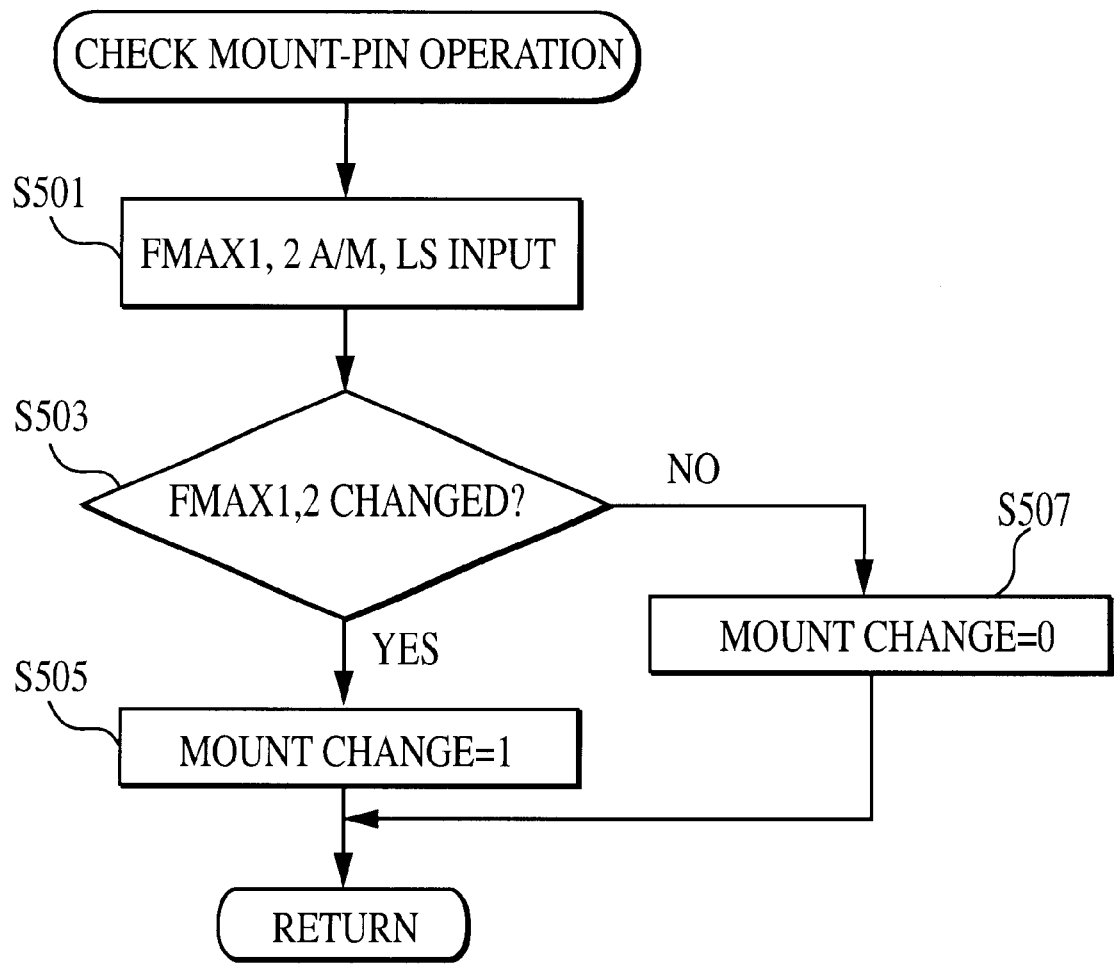
FIG. 22 is a flow chart of a mount-pin checking-operation of the new camera body according to the present invention.
Figure 23:
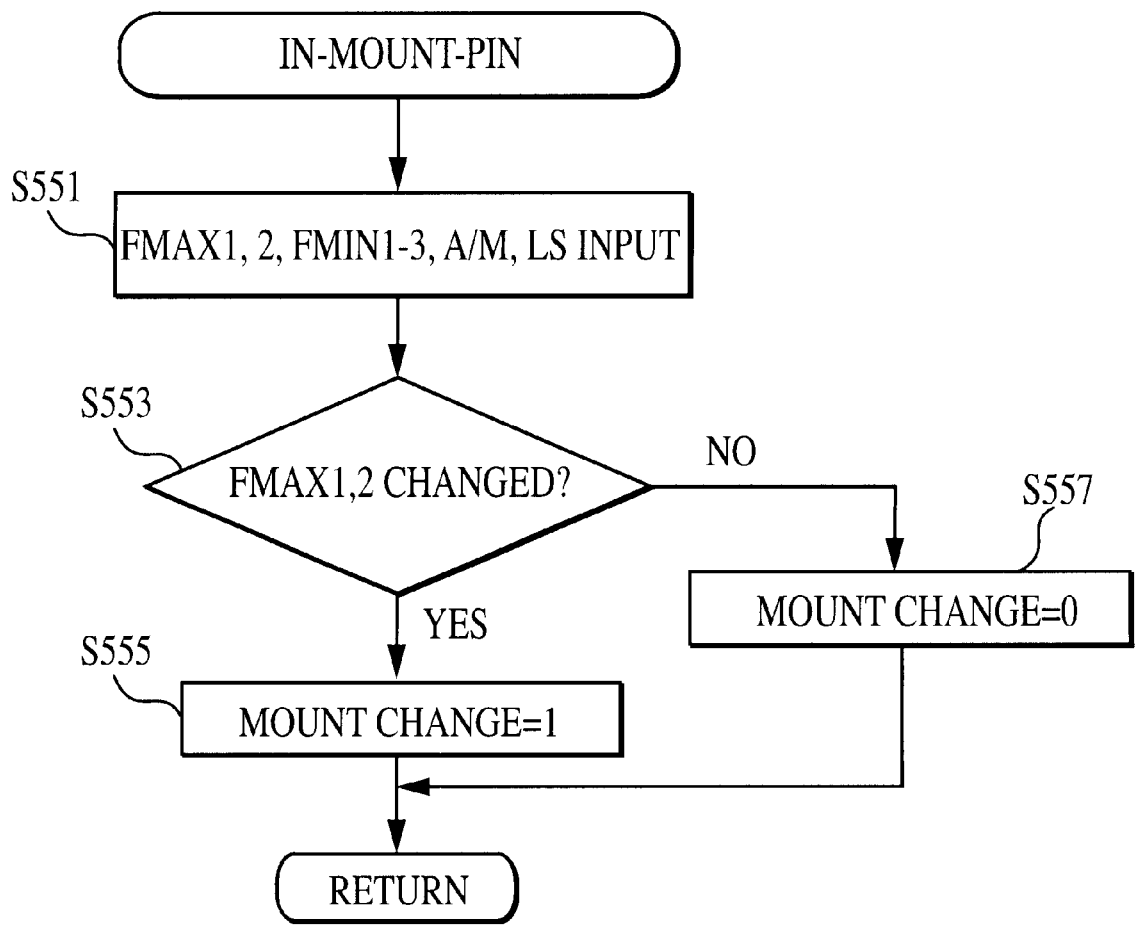
FIG. 23 is a flow chart of another mount check (an mount-pin input) operation of the new camera body according to the present invention.

The LENS-1 check operation will now be described with reference to the flow chart of FIG. 21.

Firstly, a check is made at step S401 to determine whether the LROM communication code is OK according to the communication data input from the new photographic lens 31. If the check result at step S401 is not OK, the LCODE-NG flag is set to "1" and the control proceeds to step S405 (S401, N; S403; S405). If the check result at step S401 is OK, the control skips step S403 (LCODE-NG=1) and proceeds to step S405 (S401, Y; S405). At step S405, a check is made to determine whether the attached photographic lens incorporates the lens CPU. If the lens does not incorporate the lens CPU, the LROM lens flag is set to "1" and the control is returned (S405, N; S407). If the lens incorporates the lens CPU, the control directly returns (S405, Y).

As discussed above, according to the embodiment of the present invention, when the new photographic lens 31 incorporating the ROM IC is attached, and when the level of the reset terminal RES changes from high to low, the level of the terminal Fmin2/DATA (SIO) also changes from high to low at substantially the same time. However, when the photographic lens incorporating the lens CPU is attached, even if the reset state is released at the reset terminal RES, it still requires much time for the power-ON reset operation of the CPU, and there will be no response from the terminal Fmin2/DATA (SIO). Accordingly, by first lowering the level of the reset terminal RES, and then by checking whether the level of the terminal Fmin2/DATA (SIO) is high or low, instant identification of the attached new photographic lens can be carried out. That is, if the level of the Fmin2/DATA is still high, the attached new photographic lens incorporates the lens CPU, and if the level of the Fmin2/DATA is lowered at substantially the same time, the attached new photographic lens incorporates the ROM IC.

In other words, as mentioned above, in the attached photographic lens which does not include a lens CPU, since the response circuit 303R is provided (see FIG. 16), after step S317, a low level immediately occurs at the Fmin2/DATA terminal via the response circuit 303R; thereby it can be determined that the attached photographic lens is a photographic lens which does not have a lens CPU.

In other words, in order to distinguish whether the attached photographic lens is a new photographic lens or a pre-existing photographic lens, the RES terminal which has been changed from a low level to a high level, can immediately determine whether or not the attached photographic lens includes a lens CPU via a step wherein the RES terminal is returned back to a low level. Therefore the operation time after this LENS-1 check operation can be shortened.

Figure 25:
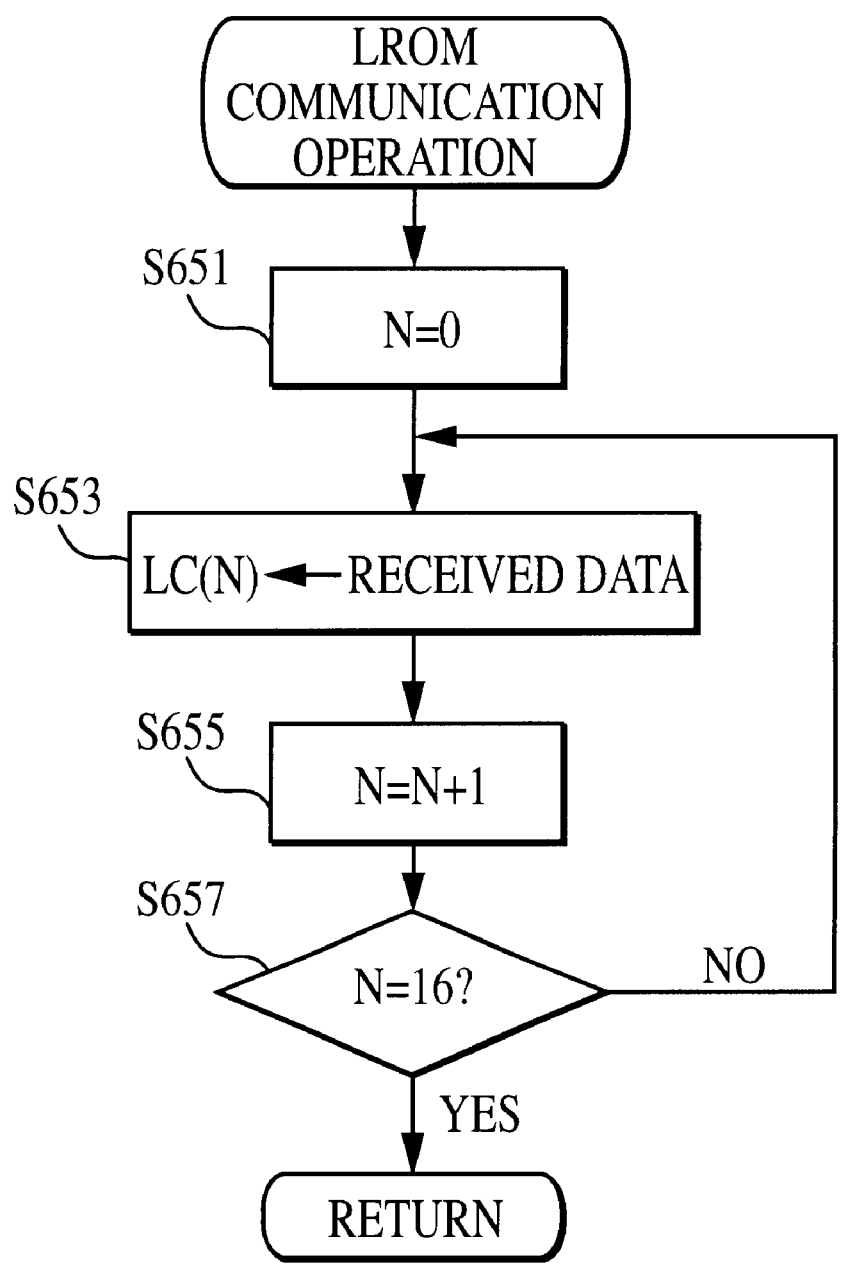
FIG. 25 is a flow chart of a lens ROM communication operation of the new camera body according to the present invention.
Figure 27:
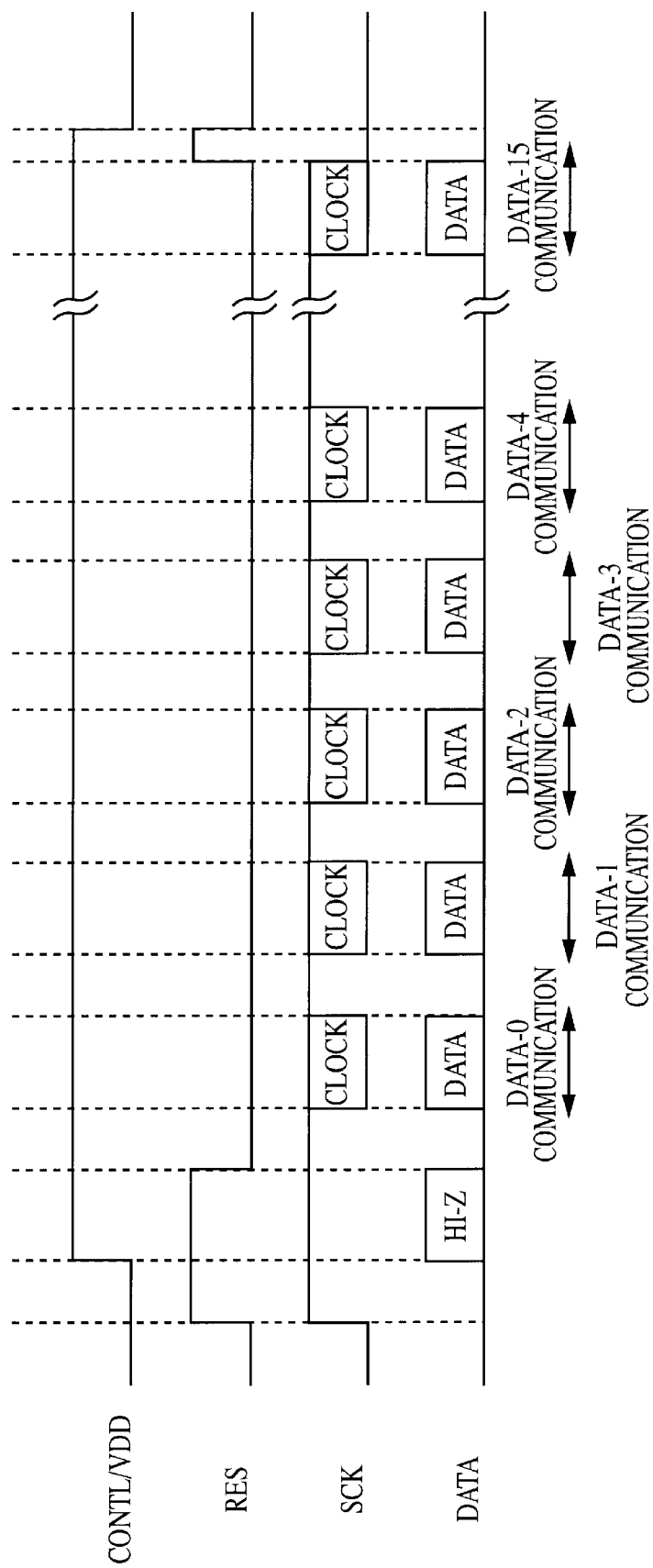
FIG. 27 is a timing chart of communication timing between the new camera body and a ROM-incorporated new photographic lens.

The LROM communication operation executed at step S321 (see FIG. 20) will now be described with reference to the flow chart of FIG. 25 and the timing chart of FIG. 27. When the control enters the LROM communication operation, the counter n which counts the received data number (byte number) is set to "0" (step S651). Then the received data is stored in the RAM of the received data address LC(n) at step S653. Subsequently, the serial communication is carried out, the counter n is incremented by 1, and a check is made to determine whether counter n equals 16 at step S657. If n does not equal 16, the control is returned to step S653. This loop operation is repeated until counter n equals 16 at step S657 (S655; S657, N; S653).

When counter n equal 16, the control is returned (S657, Y). Thus, according to the present embodiment, the 16-byte data is received from the ROM of the photographic lens.

Figure 26:
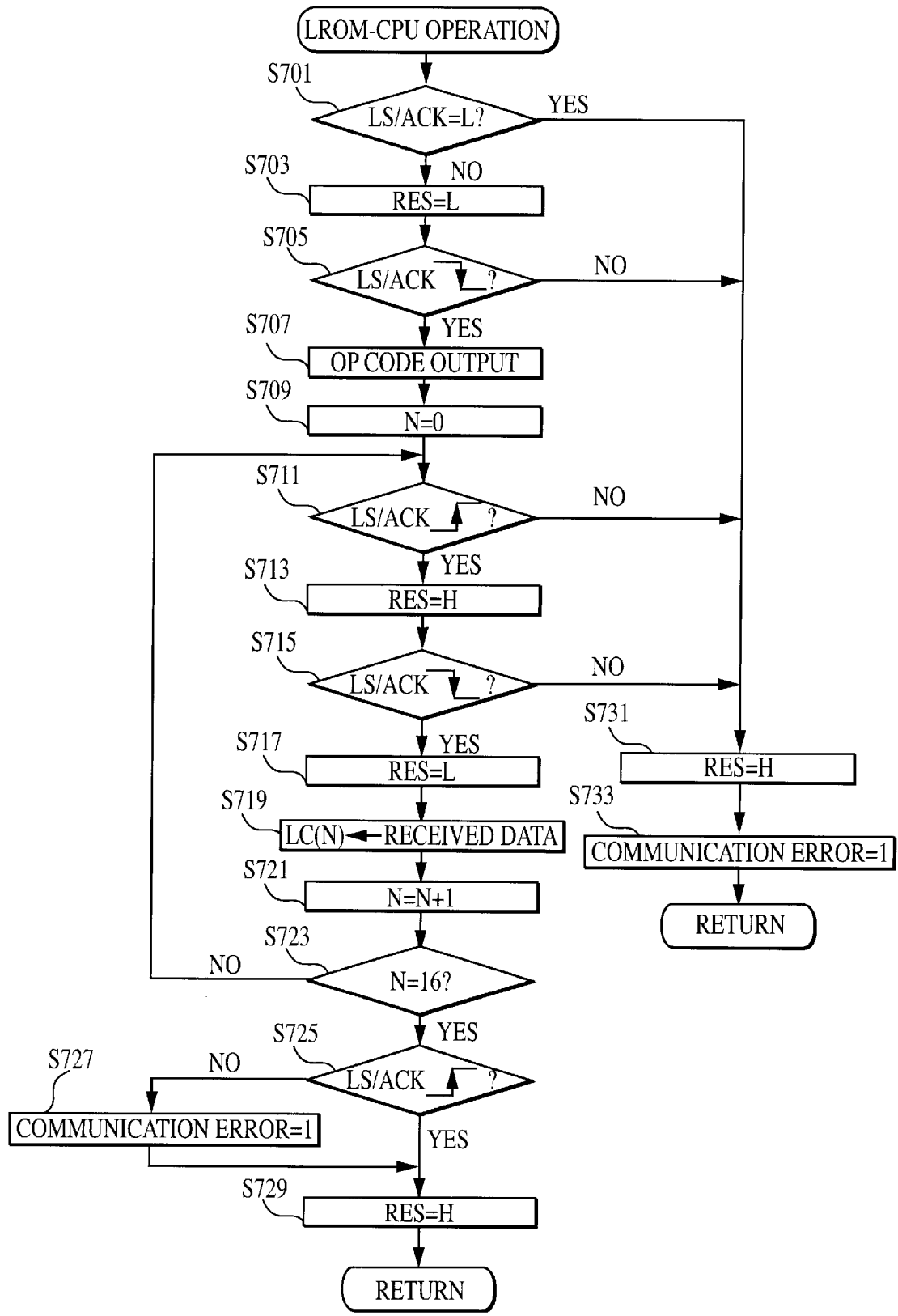
FIG. 26 is a flow chart of a lens ROM—CPU communication operation of the new camera body according to the present invention.
Figure 28:
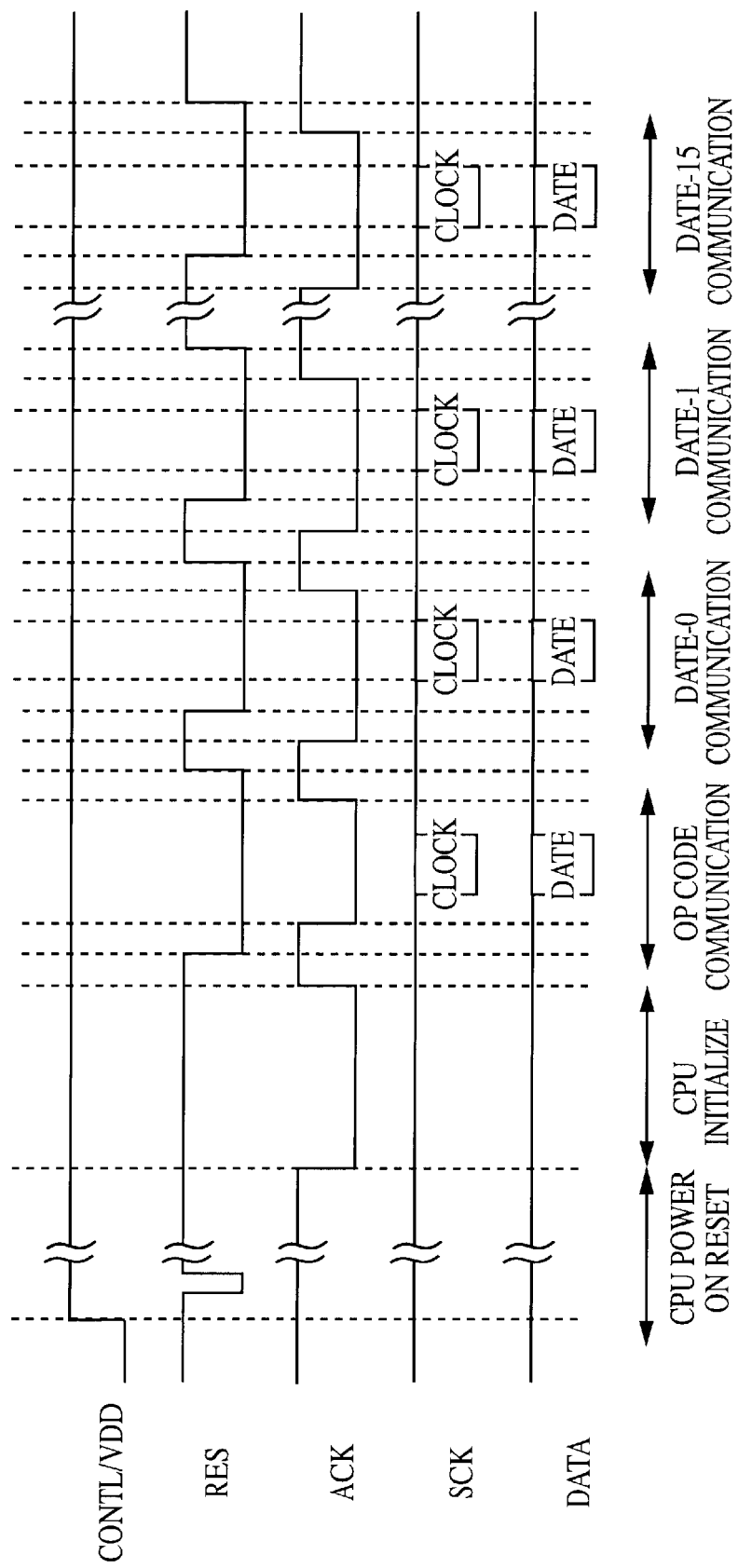
FIG. 28 is a timing chart of communication timing between the new camera body and a CPU-incorporated new photographic lens.

The lens ROM (LROM)—CPU communication operation (e.g. executed at step S211) will now be described with reference to the flow chart of FIG. 26 and the timing chart of FIG. 28. The control enters the LROM—CPU communication operation when the attached photographic lens is identified as the photographic lens incorporating a control device (i.e., the CPU). When the control enters this LROM—CPU communication operation, a check is made at step S701 to determine whether the level of the terminal LS/ACK is low. If the level of the terminal LS/ACK is low, the level of the reset terminal RES is risen to a high level in order to reset the control, the communication error flag is set to "1," and the control is returned (S701, Y; S731; S733).

Conversely, if the level of the terminal LS/ACK is not low at step S701, then the level of the reset terminal RES is lowered at step S703. Subsequently, a check is made to determine whether or not the level of the terminal LS/ACK also becomes low by the timer (S701, N; S703; S705). If the level of the terminal LS/ACK is not lowered at step S705 within a time set by the timer, the level of the reset terminal RES is risen to a high level in order to reset the control, the communication error flag is set to "1," and the control is returned (S705, N; S731; S733).

If the level of the terminal LS/ACK is low at step S705, the operation code is output, and counter n is set to "0". Thereafter, a check is made to determine whether or not the level of the terminal LS/ACK has risen (S705, Y; S707; S709; S711). If the level of the terminal LS/ACK has not risen at step S711 in spite of the operation code output, the level of the reset terminal RES is risen to a high level, the communication error flag is set to "1," and the control is returned (S711, N; S731; S733).

Conversely, if the level of the terminal LS/ACK rises at step S711 in response to the operation code output, then the level of the reset terminal RES is risen. Thereafter, a check is made at step S715 to determine whether or not the level of the terminal LS/ACK is low, and if the level thereof is not low, then the level of the reset terminal RES is risen to a high level, the communication error flag is set to "1," and the control is returned (S711, Y; S713; S715, N; S731; S733). If the level of the terminal LS/ACK is low at step S715, then the level of the reset terminal RES is lowered, and the data from the lens CPU is stored every time in the RAM of the received data address LC(n) at step S719 (S715, Y; S717; S719). Subsequently, the counter n is incremented by 1, and a check is made at step S723 to determine whether or not counter n equal 16. If n does not equal 16, the control is returned to step S711. This loop operation is repeated until counter n equal 16 at step S723 (S721; S723, N; S711).

When counter n equal 16, a check is made at step S725 to determine whether or not the level of the terminal LS/ACK has risen. If the level of the terminal LS/ACK has risen, then the level of the reset terminal RES has also risen, and the control is returned (S723, Y; S725, Y; S729). However, if the level of the terminal LS/ACK has not risen at step S725, the communication error flag is set to "1" and the control is returned (S725, N; S727; S729).

The photographic lens can incorporate the lens CPU, for example, when the camera system incorporates an AF motor whereby the lens CPU can carry out the control of driving of the AF motor, or when the camera system incorporates an lens shutter whereby the lens CPU can carry out the control of driving of the lens shutter through control of driving a shutter motor incorporated in the photographic lens. For these purposes, the communication of the necessary commands and data are carried out between the body CPU and the lens CPU by using a predetermined protocol. Thus the lens CPU is actuated according to the information received.

As discussed above, according to the present embodiment, if the attached lens is identified not to be a pre-existing lens, it is possible to further distinguish whether or not the attached photographic lens is a ROM-incorporated lens, via the output of a reset release signal immediately after the power is turned ON. Therefore lens identification can be performed in a shorter time, thus the camera can be in a state ready for photographing almost straight away. In addition, if the attached photographic lens is not a ROM-incorporated lens, then the attached photographic lens would normally be a CPU-incorporated lens; therefore, it is possible to distinguish in a shorter time whether the attached photographic lens is the ROM-incorporated lens or the CPU-incorporated lens.

As discussed above, according to the present invention, in regard to the photographic lens incorporating a memory which does not have a control device, there is further provided a response device in which the electric potential of an identifying pin changes when a reset pin receives the reset release signal from the camera body. Thus the camera body can identify whether or not the attached photographic lens has a memory, by detecting the change of electric potential of the identifying pin through the output of the reset release signal to the reset pin. Accordingly, further operations such as a photographing can promptly be carried out.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera body to which a photographic lens is attached, a data exchange being carried out by communicating with said photographic lens via a plurality of contact pins electrically connected to each other, said camera body comprising:

a reset pin, as one contact pin of said plurality of contact pins, that outputs at least one of a reset signal and a reset release signal;

an identifying pin, as another contact pin of said plurality of contact pins, that is used to identify an attached photographic lens; and an identifying device that identifies whether said attached photographic lens is one of a photographic lens provided with a control device, which is activated after a predetermined time lapses from an output of a reset release signal, and a photographic lens not provided with said control device, in accordance with a time from an output of said reset release signal output by said reset pin until an electrical potential of said identifying pin changes, wherein a data communication between said photographic lens and said camera body is set in accordance with said photographic lens identified to be attached to said camera body.

2. The camera body of claim 1, wherein said attached photographic lens that is not provided with said control device is identified when said identifying pin detects an immediate change in said electrical potential, and wherein said attached photographic lens provided with said control device is identified when said identifying pin fails to detect said immediate change in said electrical potential.

3. A photographic lens comprising a plurality of contact pins including a reset pin and an identifying pin, a data communication being carried out via a contact of said plurality of contact pins when said photographic lens is attached to a camera body, said photographic lens comprising:

a memory not including a control device; and a response device in which, when said reset pin receives a reset release signal from said camera body, an electric potential of said identifying pin changes, wherein, when said reset release signal is applied to said reset pin, said response device is synchronized with a clock signal input from said camera body via a clock pin, other than said reset pin and said identifying pin, data recorded to said memory being converted to a serial format from said identifying pin to be communicated with said camera body.

4. The photographic lens of claim 3, wherein said response device comprises:

a first switch that is controlled, after said reset release signal has been output, to selectively turn ON and OFF according to a clock signal received from another terminal and data stored in said memory; and a second switch that is set to an OFF state when said first switch is turned ON and said reset release signal is ON, wherein said identifying pin is connected between said first switch and said second switch.

5. A camera system comprising:

a photographic lens; and a camera body, said photographic lens and said camera body each respectively having a plurality of contact pins including a reset pin and an identifying pin, a data communication being carried out via a contact of said plurality of contact pins when said photographic lens is attached to said camera body, said photographic lens further comprising a response device in which an electric potential level of said identifying pin changes when said reset pin of said photographic lens receives a reset release signal from said camera body and said photographic lens incorporates a memory without including a control device, said camera system further comprising an identifying device that identifies whether said attached photographic lens incorporates said memory, by detecting the change of said electric potential level of said identifying pin through the output of said reset release signal to said reset pin of said camera body, wherein, when said reset release signal is applied to said reset pin, said response device is synchronized with a clock input from said camera body via a data pin, other than said reset pin and said identifying pin, so that data recorded to said memory is converted to serial data output from said identifying pin, such that said data communication is set between said photographic lens and said camera body in accordance with said photographic lens identified to be attached to said camera body.

6. The camera system of claim 5, wherein when said photographic lens comprises one of a first photographic lens and a second photographic lens, wherein said response device for said first photographic lens changes said electric potential level of said identifying pin within a predetermined duration of time, said response device for said second photographic lens changing said electric potential of said identifying pin after a lapse of said predetermined duration of time, said identifying device in said camera body identifying said one of said first photographic lens and said second photographic lens in accordance with a time from an output of said reset release signal by said reset pin until an electrical potential of said identifying pin changes.

7. The camera system of claim 6, wherein said response device for said second photographic lens comprises a control device, and said predetermined duration of time corresponds to a time period required to initialize said control device.

* * * * *